(12) United States Patent
Liao

(10) Patent No.: US 11,774,763 B2
(45) Date of Patent: Oct. 3, 2023

(54) OPTICAL DEVICE UTILIZING LCOS SUBSTRATE AND SPATIAL LIGHT MODULATOR

(71) Applicant: Cheng-Hsing Liao, Zhubei (TW)

(72) Inventor: Cheng-Hsing Liao, Zhubei (TW)

( * ) Notice: Subject to any disclaimer, the term of this patent is extended or adjusted under 35 U.S.C. 154(b) by 0 days.

(21) Appl. No.: 17/952,172

(22) Filed: Sep. 23, 2022

(65) Prior Publication Data
US 2023/0018763 A1    Jan. 19, 2023

Related U.S. Application Data

(63) Continuation-in-part of application No. 17/455,602, filed on Nov. 18, 2021, now Pat. No. 11,650,459.

(30) Foreign Application Priority Data

Nov. 18, 2020 (TW) .................... 10914037.9
Mar. 12, 2021 (TW) .................... 11010886.4

(51) Int. Cl.
| G02F 1/13363 | (2006.01) |
| G02F 1/1335 | (2006.01) |
| G02B 27/01 | (2006.01) |
| H04N 9/31 | (2006.01) |

(52) U.S. Cl.
CPC ....... *G02B 27/0172* (2013.01); *H04N 9/3152* (2013.01); *G02F 1/13355* (2021.01); *G02F 1/13363* (2013.01); *G02F 1/133526* (2013.01)

(58) Field of Classification Search
None
See application file for complete search history.

(56) References Cited

U.S. PATENT DOCUMENTS

| 10,416,498 B2 | 9/2019 | Liao |
| 2018/0164643 A1 | 6/2018 | Liao |
| 2020/0160772 A1 | 5/2020 | Hu et al. |

(Continued)

FOREIGN PATENT DOCUMENTS

JP    A2021108427    7/2021

OTHER PUBLICATIONS

Maindron T, Chambion, B, Provost M, et al. Curved OLED microdisplays. *J Soc Inf Display*. 2019;1-11. https://doi.org/10.1002/jsid.824.

(Continued)

*Primary Examiner* — Phu Vu
(74) *Attorney, Agent, or Firm* — Muncy, Geissler, Olds & Lowe, P.C.

(57) ABSTRACT

The invention is directed to a microdisplay of an optical device, comprising: a light source; an optical element, disposed on the light exit side of the light source to adjust the light path of the light source; an LCoS substrate, a shape of which exhibits a notch in at least one dimension, the light source projected onto the LCoS substrate, the LCoS substrate reflects the light source entering the notch; and a spatial light modulator, after an outgoing light reflected by the LCoS substrate, the outgoing light enters the spatial light modulator; the spatial light modulator adjusts an azimuth angle of a liquid crystal layer to eliminate noise of the outgoing light; wherein, the outgoing light adjusted by the spatial light modulator is projected onto a eyepieces to display images without the fringe field effects.

15 Claims, 20 Drawing Sheets

(56) References Cited

U.S. PATENT DOCUMENTS

2020/0201129 A1\* 6/2020 Amari ............... G02F 1/133553
2021/0141229 A1   5/2021 Mathur et al.
2022/0101807 A1\* 3/2022 Pires Arrifano ..... G03H 1/2294

OTHER PUBLICATIONS

Xiong, Jianghao, "*Diffractive Liquid Crystal Optical Elements For Near-eye Displays*" (2022). Electronic Theses and Dissertations, 2020-. 1117, 123 pages, https://stars.library.ucf.edu/etd2020/1117.

Corning, Anne, *Exploring the Potential of LCoS Microdisplays*, Radiant Vision Systems, 2020, 5 pages.

Guenter et al., *Highly curved image sensors—a practical approach for improved optical performance*, Optics Express vol. 25, Issue 12, pp. 13010-13023 (2017) https://doi.org/10.1364/OE.25.013010.

Jonghyun Kim, Manu Gopakumar, Suyeon Choi, and Yifan Peng, Ward Lopes, and Gordon Wetzstein. 2022. *Holographic Glasses for Virtual Reality*. In Special Interest Group on Computer Graphics and Interactive Techniques Conference Proceedings (SIGGRAPH '22 Conference Proceedings), Aug. 7-11, 2022, Vancouver, BC, Canada. ACM, New York, NY, USA, 9 pages. https://doi.org/10.1145/3528233.3530739.

Huang et al., *Liquid-Crystal-on-Silicon for Augmented Reality Displays*, Applied Sciences, Appl. Sci. 2018, 8, 2366, 17 pages, ; Licensee MDPI, Basel, Switzerland. http://dx.doi.org/10.3390/app8122366.

\* cited by examiner

US 11,774,763 B2

OPTICAL DEVICE UTILIZING LCOS SUBSTRATE AND SPATIAL LIGHT MODULATOR

CROSS-REFERENCE TO RELATED APPLICATIONS

This application is a continuation-in-part of the co-pending U.S. patent application Ser. No. 17/455,602, filed on Nov. 18, 2021, which claims priorities of Nos. 109140379 and 110108864 respectively filed in Taiwan R.O.C. on Nov. 18, 2020 and 12 Mar. 2021 under 35 USC 119, the entire contents of which are hereby incorporated by reference.

BACKGROUND OF THE INVENTION

Field of the Invention

The invention relates to an optical device, and more particularly to an optical device utilizing a microdisplay has a shape of which exhibits a notch in at least one dimension.

Description of the Related Art

In currently published prior art, VR scenario typically involves presentation of digital or virtual image information without transparency to other actual real-world visual input; an augmented reality AR scenario typically involves presentation of digital or virtual image information as an augmentation to visualization of the actual world around the user. However, due to technical bottlenecks, the prior art utilizes a flat LCoS substrate as the optical reflection surface, there is a need in the art for improved wearable device.

BRIEF SUMMARY OF THE INVENTION

The invention is directed to a microdisplay of an optical device, comprising: a light source; an optical element, disposed on the light exit side of the light source to adjust the light path of the light source; an LCoS substrate, a shape of which exhibits a notch in at least one dimension, the light source projected onto the LCoS substrate, the LCoS substrate reflects the light source entering the notch; and a spatial light modulator, after an outgoing light reflected by the LCoS substrate, the outgoing light enters the spatial light modulator; the spatial light modulator adjusts an azimuth angle of a liquid crystal layer to eliminate noise of the outgoing light; wherein, the outgoing light adjusted by the spatial light modulator is projected onto a eyepieces to display images without the fringe field effects.

In one embodiment, the optical element comprising: a polarizer, converting a polarized light according to the incident light source; and a lens array, after the incident light passes through the lens array, the incident light is made uniform, and the lens array adjusts the light path of the incident light entering the LCoS substrate; wherein, the LCoS substrate reflects the incident light, so that the outgoing light enters the SLM to eliminate noise; the outgoing light is guided by a waveguide in the eyepieces and reflected into a user's eyes by a grating; and the spatial modulator eliminates the fringe field effect of the incident light.

In one embodiment, the SLM comprising: a transparent electrode layer; a reflective electrode layer including a pixel electrode, in which a pixel area is surrounded by a boundary of the pixel electrode; a liquid crystal layer located between the transparent electrode layer and the reflective electrode layer to establish the pixel formed by the liquid crystal layer covering the pixel area in the pixel electrode; and an alignment film having a first pattern and a second pattern and covering the pixel area, wherein the first pattern and the second pattern in the pixel area make liquid crystals in the liquid crystal layer of the pixel generate arrangements of a first azimuth angle and a second azimuth angle, respectively, and the first azimuth angle is different from the second azimuth angle; wherein, if the liquid crystal layer is regarded as being parallel to an X-Y plane, then the first azimuth angle and the second azimuth angle are both an included angle between an X-axis and each of the liquid crystals in the liquid crystal layer on the X-Y plane.

DETAILED DESCRIPTION OF THE INVENTION

Figure 1:
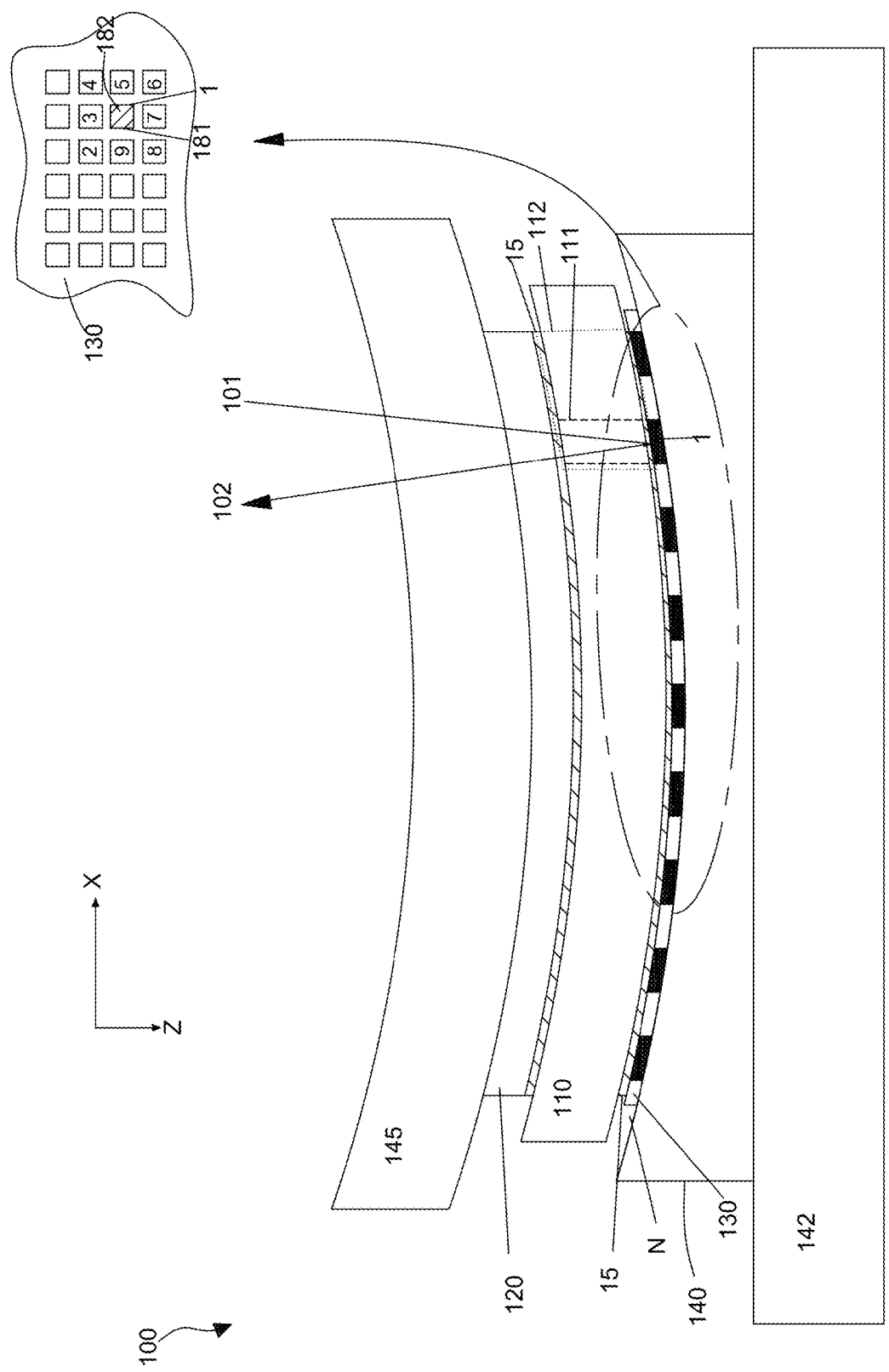
FIG. 1 is a schematic view showing an embodiment of this disclosure.

FIG. 1 is a schematic view showing a spatial light modulator (SLM) 100 of an embodiment of this disclosure. Referring to FIG. 1, the SLM 100 includes a transparent electrode layer 120, a reflective electrode layer 130, and a liquid crystal (LC) layer 110 and an alignment film 15 located between the transparent electrode layer 120 and the reflective electrode layer 130.

Please note that the reflective electrode layer 130 includes multiple pixel electrodes (e.g., pixel electrodes 1 to 9) being arranged in an array and forming multiple pixels. Each pixel includes one pixel electrode and a portion of the LC layer 110 thereabove. A pixel area 182 in the pixel electrodes 1 to 9 is surrounded by a boundary 181 of the pixel electrode.

The LC layer 110 is located between the transparent electrode layer 120 and the reflective electrode layer 130 to establish one pixel. The pixel is formed by the LC layer 110 covering the pixel area 182 of the pixel electrode.

The alignment film 15 has a first pattern and a second pattern and covers the pixel area. The first pattern and the second pattern of the pixel area 182 make liquid crystals in the LC layer 110 of the pixel in the pixel area 182 generate arrangements of a first azimuth angle and a second azimuth angle, respectively, and the first azimuth angle is different from the second azimuth angle.

In one embodiment, the reflective electrode layer 130 is formed on a LCoS substrate 140, so that the SLM 100 is a liquid crystal on silicon (LCoS) (or monocrystalline silicon reflective liquid crystal) SLM. A rigid slab 142, such as a ceramic substrate or a metal slug, may be used to mechanically support the LCoS substrate 140 and the components thereon. A glass slab 145 is installed on the transparent electrode layer 120 to offer the mechanical protection thereto while allowing light to travel through to reach the LC layer 110 if the SLM 100 is intended to modulate visible light.

In one embodiment, the LCoS substrate 140 and SLM 100 have a shape of which exhibits a notch N in at least one dimension. In other words, the glass slab 145, the transparent electrode layer 120, the alignment film 15, LC layer 110, reflective electrode layer 130 and the LCoS substrate 140 have a curved surface or exhibit curvature in at least one dimension.

The indium tin oxide (ITO) can be used to form the transparent electrode layer 120. In most practical realizations, the LC layer 110 is homogeneous (with LC molecules therein aligned in a direction parallel to the transparent electrode layer 120), homeotropical (with the LC molecules aligned in a direction perpendicular to the transparent electrode layer 120) or twisted (with the LC molecules aligned in a helix-like structure).

One aspect of this disclosure is to provide a SLM for modulating incident light, wherein the LC layer of the SLM is configured to make the azimuth angles of the pixel electrodes have the uneven distribution (i.e., the alignment film 15 has two different pattern areas), so that the difference of the azimuth angle is present between the corresponding areas to suppress the FFE, and the shapes of the pixel electrodes need not to be changed. For example, if rectangular pixel electrodes are used in the initial design, the similar rectangular pixel electrodes still can be used after this disclosure has been applied to the initial design.

FIG. 1 depicts the structure of one exemplary SLM 100 of this disclosure. The SLM 100 includes a transparent electrode layer 120, a reflective electrode layer 130, and a LC layer 110 located between the transparent electrode layer 120 and the reflective electrode layer 130. The reflective electrode layer 130 includes multiple pixel electrodes (include pixel electrodes 1 to 9) arranged in an array to form multiple pixels. Each pixel includes one pixel electrode and a portion of the LC layer 110 thereon. In one embodiment, the reflective electrode layer 130 is formed on the LCoS substrate 140, so that the SLM 100 is a LCoS SLM.

A rigid slab 142, such as a ceramic substrate or a metal slug, may be used to mechanically support the LCoS substrate 140 and the components thereon. Preferably, a glass slab 145 is installed on the transparent electrode layer 120 to offer the mechanical protection thereto while allowing light to travel through to reach the LC layer 110 if the SLM 100 is intended to modulate visible light. It is known to those skilled in the art that the indium tin oxide (ITO) can be used to form the transparent electrode layer 120. In most practical realizations, the LC layer 110 is homogeneous (with LC molecules therein aligned in a direction parallel to the transparent electrode layer 120), homeotropical (with the LC molecules aligned in a direction perpendicular to the transparent electrode layer 120) or twisted (with the LC molecules aligned in a helix-like structure).

For conciseness, the following description will be made by taking the pixel electrodes 1 to 9 functioning as representative pixel electrodes. The pixel electrode 1 has one pixel area 182 surrounded by the boundary 181 of the pixel electrode 1. A pixel 111 is formed on the pixel electrode 1, and is the LC layer 110 covering the pixel area 182. Because the pixel 111 is located on the pixel area 182, the pixel boundary of the pixel 111 is also the boundary 181. An enlarged pixel 112 including the pixel 111 and one adjacent pixel is also defined. When an incident light ray 101 enters the pixels 111 and 112, the incident light ray 101 experiences an optical phase retardation with an amount depending on a voltage difference between the pixel electrode 1, 5 (or 3, 7, and 9) and the transparent electrode layer 120. When the incident light ray 101 reaches the pixel electrode 1, 5 (or 3, 7, and 9), the incident light ray 101 is reflected or diffracted to form a reflected or diffraction light ray 102. During traveling through the LC layer 110 again, the reflected or diffraction light ray 102 further experiences an additional phase retardation substantially close to the aforesaid amount. In total, a phase retardation close to two times of the aforesaid amount is provided.

The pixel 111 has neighboring pixels immediately adjacent to the pixel 111, where these neighboring pixels are formed as portions of the LC layer 110 on the pixel electrodes 2 to 9. When any one of the pixel electrodes 2 to 9 is applied with a voltage different from another voltage applied to the pixel electrode 1, a FFE that negatively affects the pixel 111 results. Consequently, the phase retardation produced by the pixel 111 becomes non-uniform over the pixel area 182, so that the pixel 111 has a two-dimensional uneven distribution of phase retardation.

Figure 2:
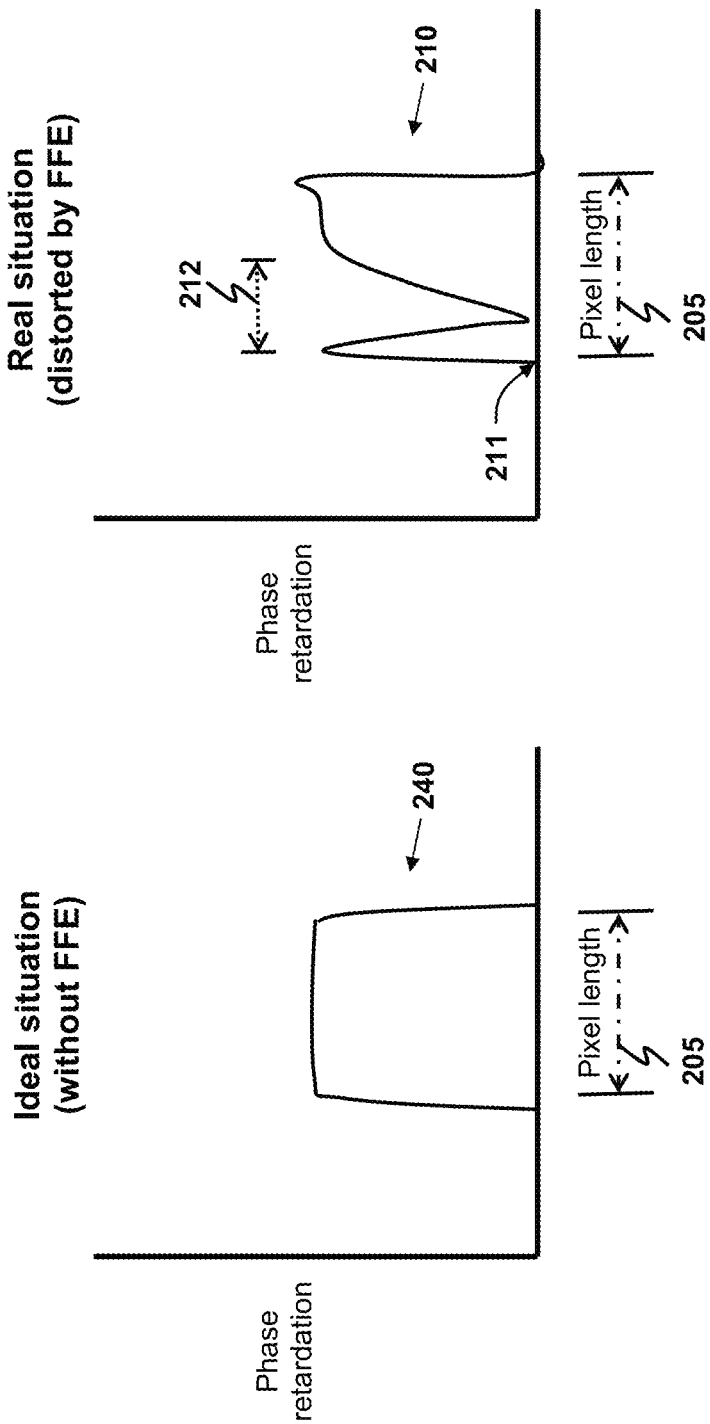
FIG. 2 depicts a typical distribution of a phase retardation under the influence of a FFE, and an ideal phase retardation distribution without the influence of the FFE.

FIG. 2 depicts a one-dimensional typical distribution 210 of a phase retardation along a pixel length 205 under the influence of a FFE, and an ideal phase retardation distribution 240 without the influence of the FFE. When the typical distribution 210 is compared to the ideal phase retardation distribution 240, it is obtained that the FFE causes a great fluctuation in the phase retardation over a certain affected portion 212 of the pixel length 205 near a pixel boundary 211.

The Inventor has found that the phase-retardation fluctuation can be substantially reduced by micro-manipulating "a FFE-opposing feature" over the affected portion 212 to oppose the FFE. The FFE-opposing feature is a tunable property of the LC layer 110. As identified by the Inventor, a usable set of FFE-opposing features includes an azimuth angle. The azimuth angle relates to the arrangement density and the arrangement strength of the liquid crystals, which correspondingly determine the ability of LC against the FFE.

According to this disclosure, at least one of the pixels in the LC layer 110 is realized as an optimized pixel, which is a pixel specifically configured to oppose the FFE based on micro-manipulating one selected FFE-opposing feature. Most preferably, each of the pixels in the LC layer 110 is realized as the optimized pixel. In the following description, the pixel 111 on the pixel electrode 1 is taken as an exemplary pixel realized as the optimized pixel. An uneven distribution (i.e., a non-uniform distribution) of the FFE-opposing features on the pixel area 182 is selected or determined to oppose the FFE induced by the neighboring pixels resided on the pixel electrodes 2 to 9.

Because the FFE mainly affects the pixel boundary 181 of the pixel 111, simplifications can be further made. The affected portion 212 of the pixel 111 is an outer area of the pixel 111, where the outer area represents the pixel boundary 181 and an area extending inwards from the boundary 181 by a certain distance, which can be estimated through computation or computer simulation.

Figure 3:
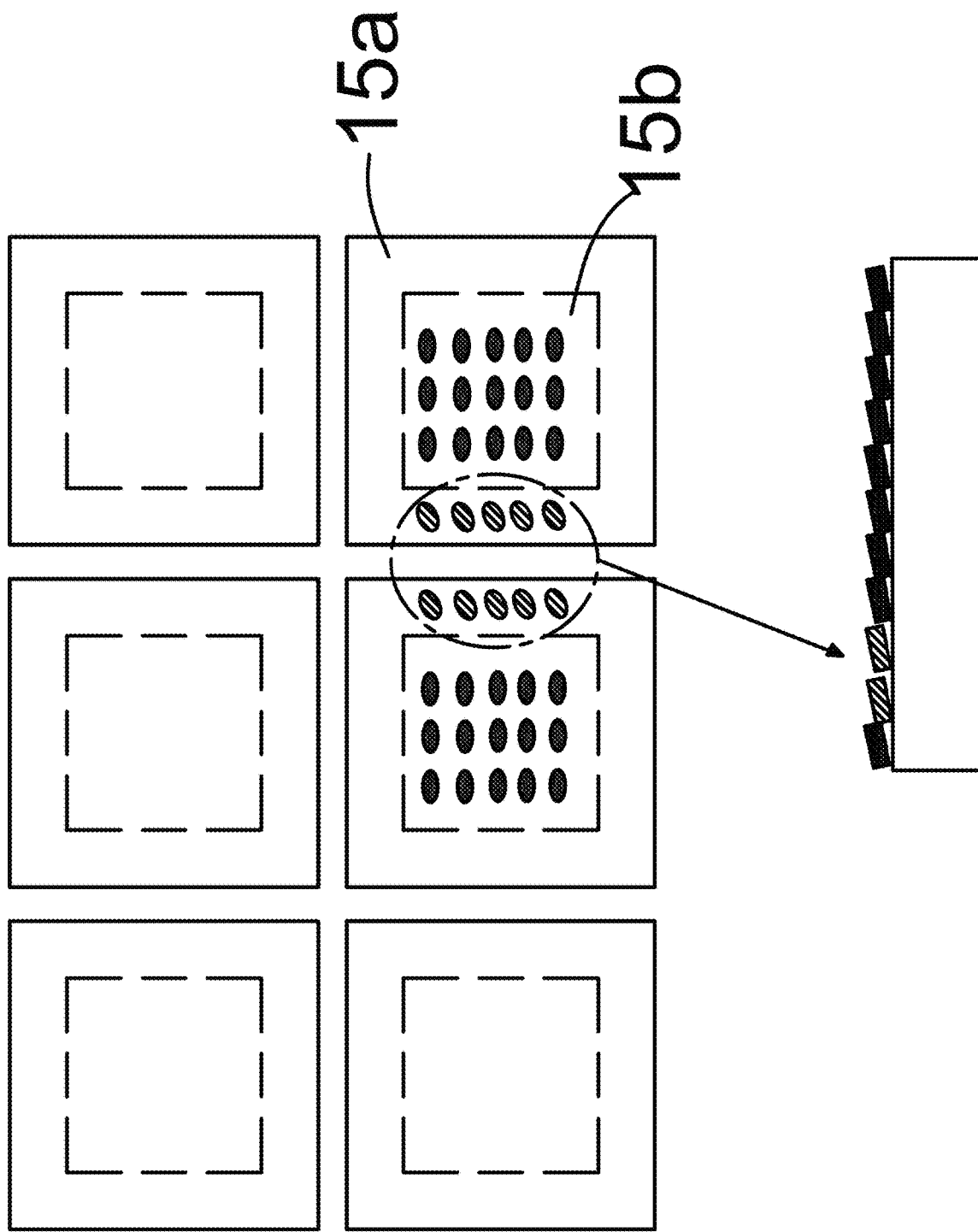
FIG. 3 is a schematic transversal cross-section view showing the FFE after the azimuth angle correction.

FIG. 3 is a schematic transversal cross-section view showing the FFE after the azimuth angle correction. Referring to FIG. 3, each square solid frame represents one pixel area, and the pixel area of each pixel has a first area 15a and a second area 15b (square dashed frame), wherein the first area 15a is the position of the first pattern, the top view of the first area in this embodiment is a square ring, the first area 15a surrounds the second area 15b, the second area 15b is a square area filled up an inside of the square ring, and the width of the square ring is greater than or equal to the range of the FFE of the pixel.

Figure 4:
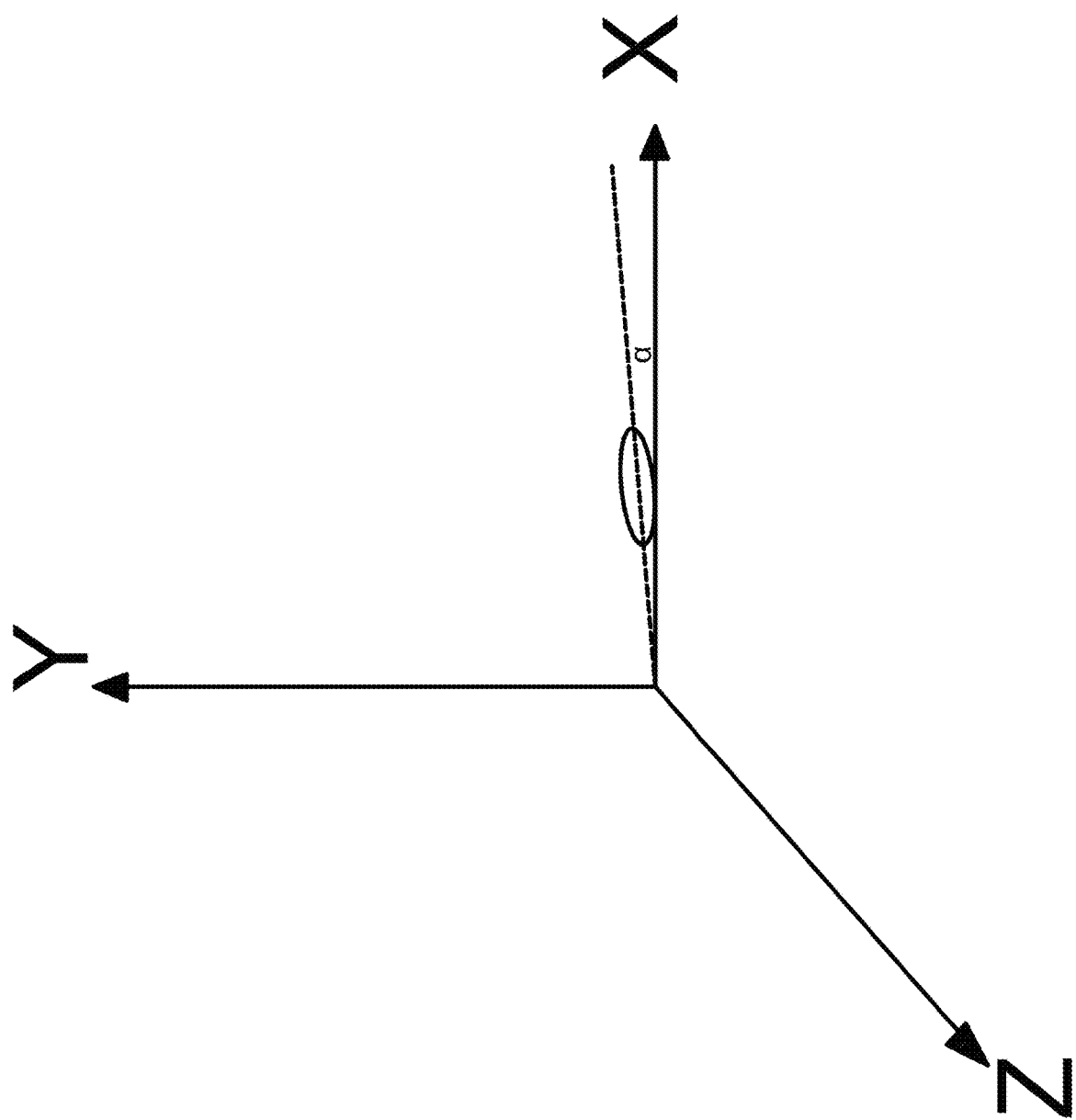
FIG. 4 is a schematic view showing a liquid crystal located in a three-dimensional coordinate system.

FIG. 4 is a schematic view showing a liquid crystal located in a three-dimensional coordinate system. Referring to FIGS. 1, 3 and 4, if the liquid crystal layer is regarded as being parallel to an X-Y plane, then an included angle between the X-axis and each of the liquid crystals of the liquid crystal layer of the first area 15a on the X-Y plane is the first azimuth angle α greater than 0 degrees and smaller than or equal to 5 degrees.

In one embodiment, as mentioned hereinabove, the second azimuth angle β (not shown) in the second area 15b is equal to 0 degrees, and the included angle between the Z-axis and each of the first azimuth angle α and the second azimuth angle β is equal to 90 degrees. That is, the first area 15a and the second area 15b are located on the X-Y plane.

Figure 5:
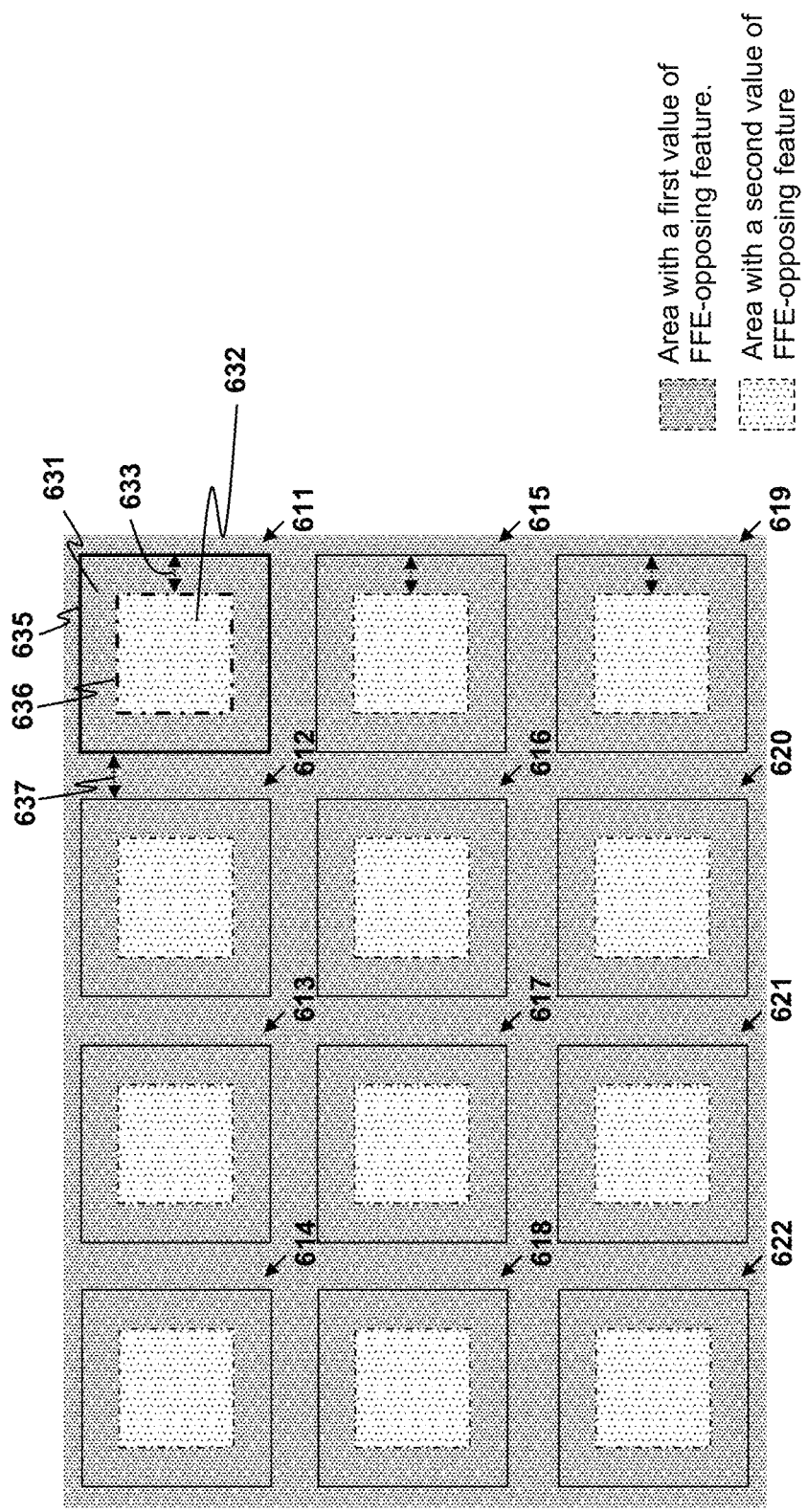
FIG. 5 is a schematic view showing an uneven distribution of FFE-opposing features.

The pixel areas of each pixel have two different patterns forming two different azimuth angles α and β. In other words, the liquid crystals of each pixel area form the uneven distribution of the square ring to oppose the FFE. FIG. 5 functions as an embodiment describing the FFE-opposing feature of the uneven distribution of 12 optimum pixels 611 to 622. In the following description, the optimum pixel 611 functions as a representative optimum pixel. The pixel 611 has a pixel boundary 635. An outer area 631 of the pixel 611 is an area between the pixel boundary 635 and a phantom line 636. The phantom line 636 is located on the optimum pixel 611, and distant from the pixel boundary 635 by a distance 633. The distance 633 is determined such that the outer area 631 is an affected portion (i.e., the affected portion 212). An inner area 632 is an area surrounded by the phantom line 636. The pixel 611 is configured such that the outer area 631 has a first value of FFE-opposing feature, and the inner area 632 has a second value of FFE-opposing feature. Please note that the pixels 611 to 622 are formed on one continuous LC layer (e.g., the LC layer 110). An interpixel gap is formed between two neighboring pixels. For example, a gap 637 is formed between two pixels 611 and 612. Actually, the LC layer on the gap 637 may be configured to have the first value of FFE-opposing feature. Thus, the discontinuity of the FFE-opposing feature along the pixel boundary 635 can be avoided.

Figure 6:
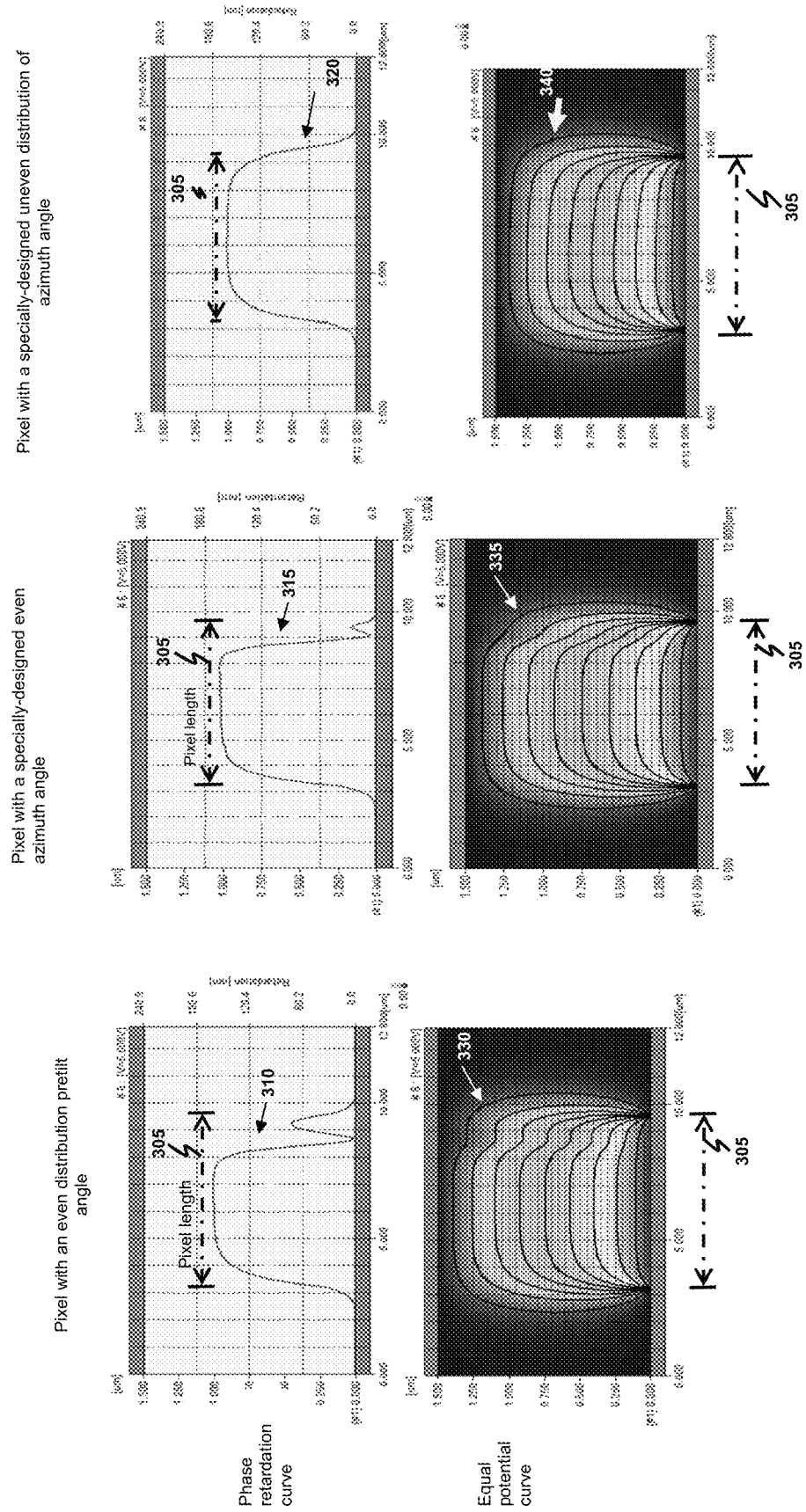
FIG. 6 depicts that the FFE is effectively opposed by the uneven distribution of the azimuth angles.

FIG. 6 depicts that the FFE is effectively opposed by the uneven distribution of the azimuth angles. Referring to FIG. 6, a case using an uneven distribution of azimuth angles and a reference case using an even distribution are depicted on each of phase retardation curves 310, 315 and 320 and each of equal potential curves 330, 335 and 340 over a pixel length 305. The computer analogy is used to obtain the curves 310, 315, 320, 330, 335 and 340 under the following conditions: the pixel length is equal to 6.2 μm; the interpixel gap is equal to 0.2 μm; the voltage difference between two neighboring pixels in the worst case is equal to 5V; a pretilt angle of the pixel on the outer area is equal to 85°, and the outer area ranges between the pixel boundary and a boundary distant therefrom by 1 μm; and another pretilt angle on the remaining portion of the pixel is equal to 88°. It is apparent that, over the pixel length 305, the flat region of the phase retardation curve 320 corresponding to the uneven distribution of azimuth angles is longer than the flat regions corresponding to the phase retardation curves 310 and 315 corresponding to the even distribution case. Similar conclusion is also obtained when examining the equal potential curves 330, 335 and 340. The effectiveness of using the uneven distribution of azimuth angles is demonstrated.

In one embodiment, a nanostructured alignment layer (not shown) may be added onto the alignment film 15 to modify the azimuth angle so that the liquid crystals have the uneven distribution of azimuth angles. The nanostructured alignment layer is patterned to form nanostructures on the alignment film 15 thereof, and the nanostructures have the sizes and shapes for realizing the first pattern and the second pattern, so that the liquid crystals in the pixel area have the uneven distribution of azimuth angles. That is, pattern transfer printing of the nanostructured alignment layer is directly performed by way of nanoimprinting using a motherboard, thereby causing the surface to have the uneven microgroove structures and thus controlling arrangements of liquid crystal molecules.

FIG. 3 is a schematic transversal cross-section view showing the FFE after the azimuth angle correction, where the difference between the azimuth angles of the liquid crystal molecules are enlarged. Based on the optical alignment process, the pretilt angle and anchoring energy method cannot provide the precise control. Correspondingly, based on the optical alignment process, the azimuth-angle method can be easily controlled to be more precise in the production process. In addition, using the azimuth-angle method can reduce and completely suppress crosstalk of the FFE.

In one embodiment, the alignment film includes a LC material and a polymerized material formed by polymerization of a monomer for stabilizing the LC material. The polymerized material is formed by the monomer having an uneven distribution of polymerization degrees over the pixel area. Regarding the alignment film, a light beam having an intensity without a gradient change is used to irradiate the monomer to form the first pattern and the second pattern, so that the liquid crystal layer has two different azimuth angles in the first area 15a and the second area 15b. That is, the optical alignment uses the polarized ultraviolet light (UV) to irradiate polymer having the photosensitive base in a specific direction, so that the breakdown and rearrangement of molecular chains are generated to cause the microgrooves or polymer backbones on the surface of the alignment film to have the isotropic distribution and thus to control the arrangement of the liquid crystal molecules.

Please note that if the alignment film 15 of this disclosure is formed using the optical alignment method, then a light beam having an intensity without a gradient change is used to irradiate a monomer to successively form the first pattern and the second pattern of the alignment film 15, so that the liquid crystal layer has the first azimuth angle and the second azimuth angle to achieve the uneven distribution of azimuth angles.

Figure 7A:
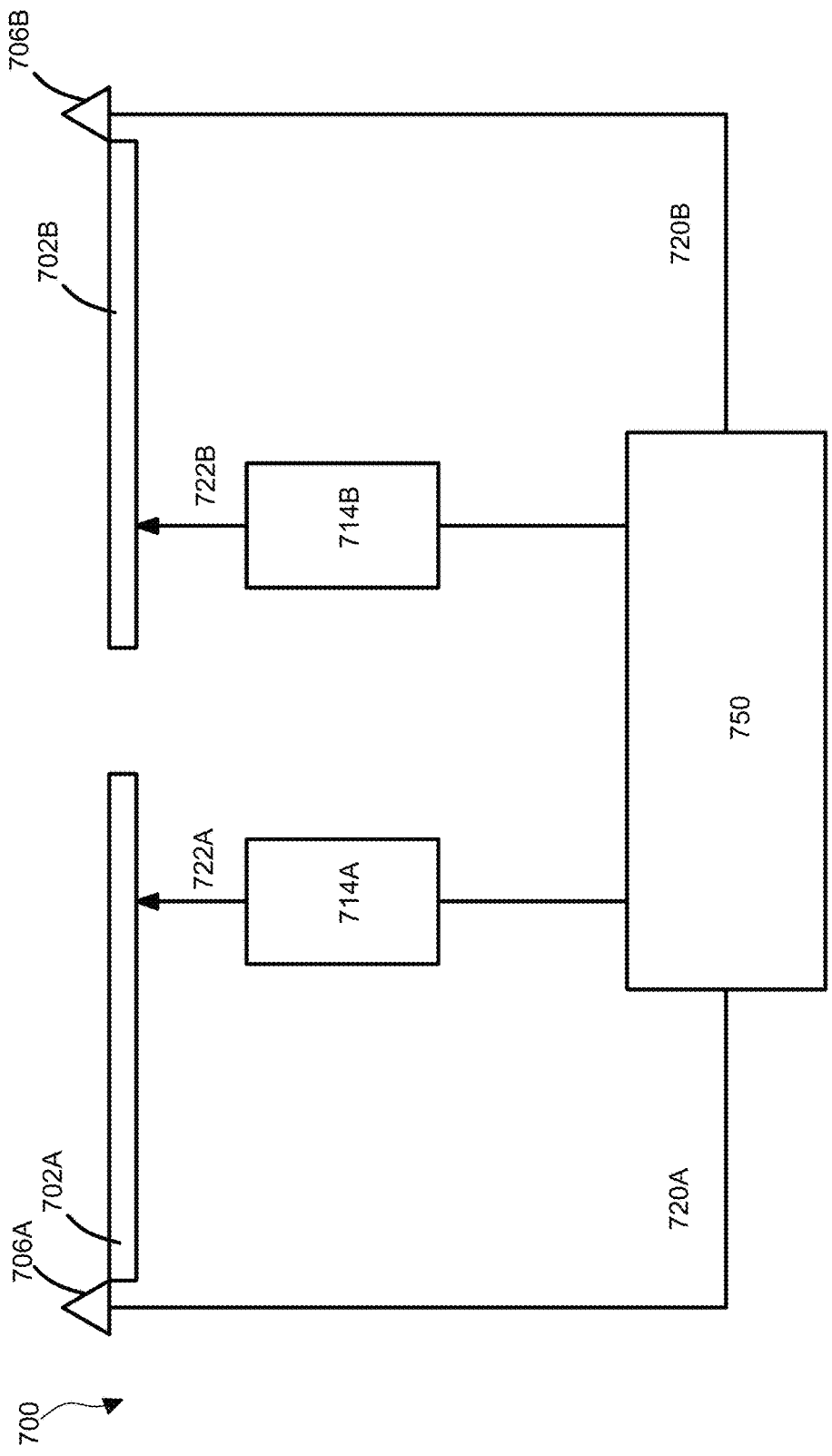
FIG. 7A is a schematic view showing the invention in one embodiment.

Please refer to FIG. 7A. FIG. 7A is a schematic view showing the invention in one embodiment. FIG. 7A illustrates a schematic view of a wearable device 700 according to the present invention. Wearable device 700 includes a left eyepiece 702A and a right eyepiece 702B. In one embodiment, wearable device 700 includes world camera 706A attached directly to or near left eyepiece 702A, a world camera 706B attached directly to or near right eyepiece 702B. In some embodiments, wearable device 700 includes one or more image projection devices such as a left optical device 714A optically linked to left eyepiece 702A and a right optical device 714B optically linked to right eyepiece 702B.

Figure 7B:
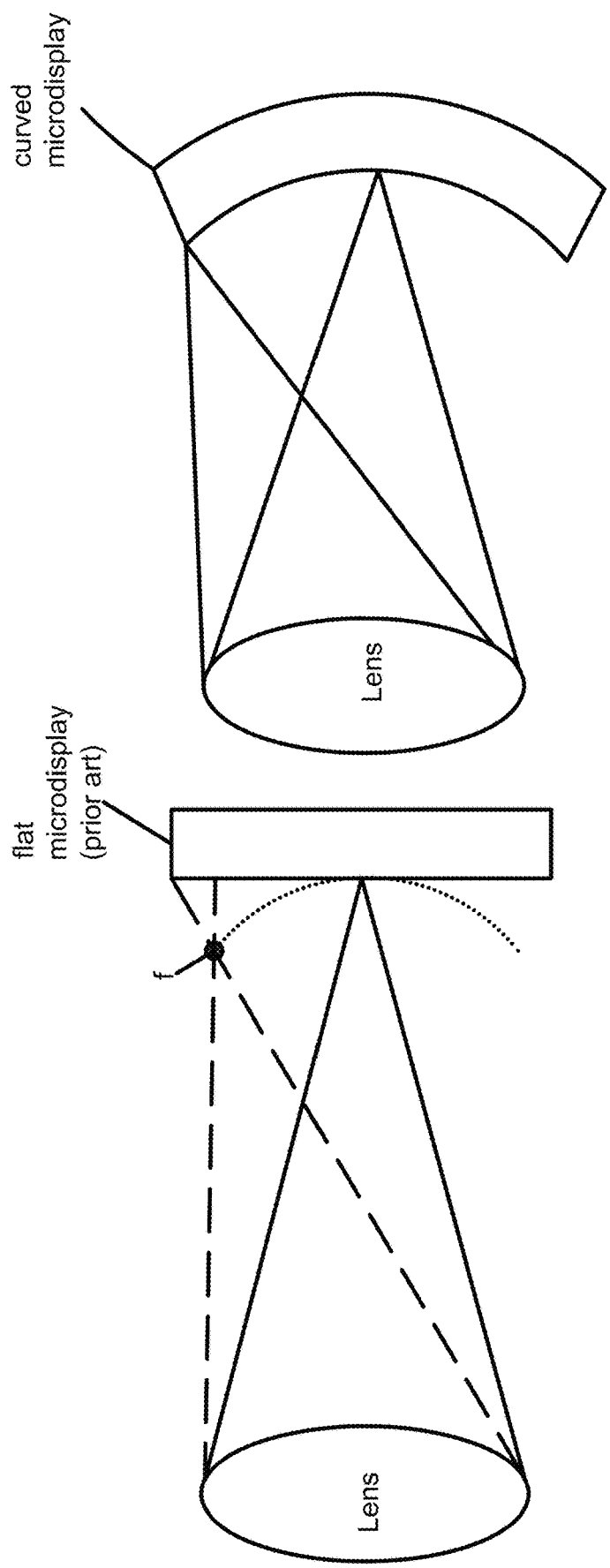
FIG. 7B is a schematic view showing microdisplay in one embodiment.

Specifically, processing module 750 receives left front image 720A from left world camera 706A, and right front image 720B from right world camera 706B. In one embodiment, world camera 706A and world camera 706B provide the light information from ambient light to make the processing module 750 to control the light source of optical device 714A and optical device 714B. In one embodiment, the world camera 706A and world camera 706B can track eye position or pupil position; in another embodiment, the world camera 706A and world camera 706B can detect objects or hand gestures based on Time of Flight (ToF). Wherein, the optical device 714A and optical device 714A utilizing a microdisplay has a shape of which exhibits a notch in at least one dimension. Please also refer to FIG. 7B, FIG. 7B is a schematic view showing microdisplay in one embodiment. The curved microdisplay provides the following advantages: 1. compact, higher image quality and large Field of view (FOV); 2. AR/VR optical engine volume is 25% small than current product; 3. Since the shape of the microdisplay surface is similar to the human eyes, it has better image quality for human eyes. 4. larger FOV to real near eye product. As FIG. 7B, part of the light of the flat microdisplay (prior art) on the surface of the microdisplay, e.g., point f. This invention provides the curved microdisplay, the light of the curved microdisplay can be on the surface of the microdisplay. Therefore, this invention has larger FOV. Conversely, On the flat image plane, the sharpness of the image changes from the center to the edge, and the focus f forms an arc rather than on the flat image plane, which is called field curvature. We provide a curved image plane to resolve the field curvature.

Moreover, eyepieces 702A and eyepieces 702B may comprise transparent or semi-transparent waveguides configured to direct light from optical device 714A and optical device 714B, respectively. Specifically, processing module 750 may cause left optical device 714A to output a left virtual image light 722A onto left eyepiece 702A (causing a corresponding light field associated with left virtual image light 722A to be projected onto the user's retina), and may cause right optical device 714B to output a right virtual image light 722B onto right eyepiece 702B (causing a corresponding light field associated with right virtual image light 722B to be projected onto the user's retina). In some embodiments, eyepieces 702A and eyepieces 702B may comprise a plurality of waveguides corresponding to different colors and/or different depth planes.

Figure 8A:
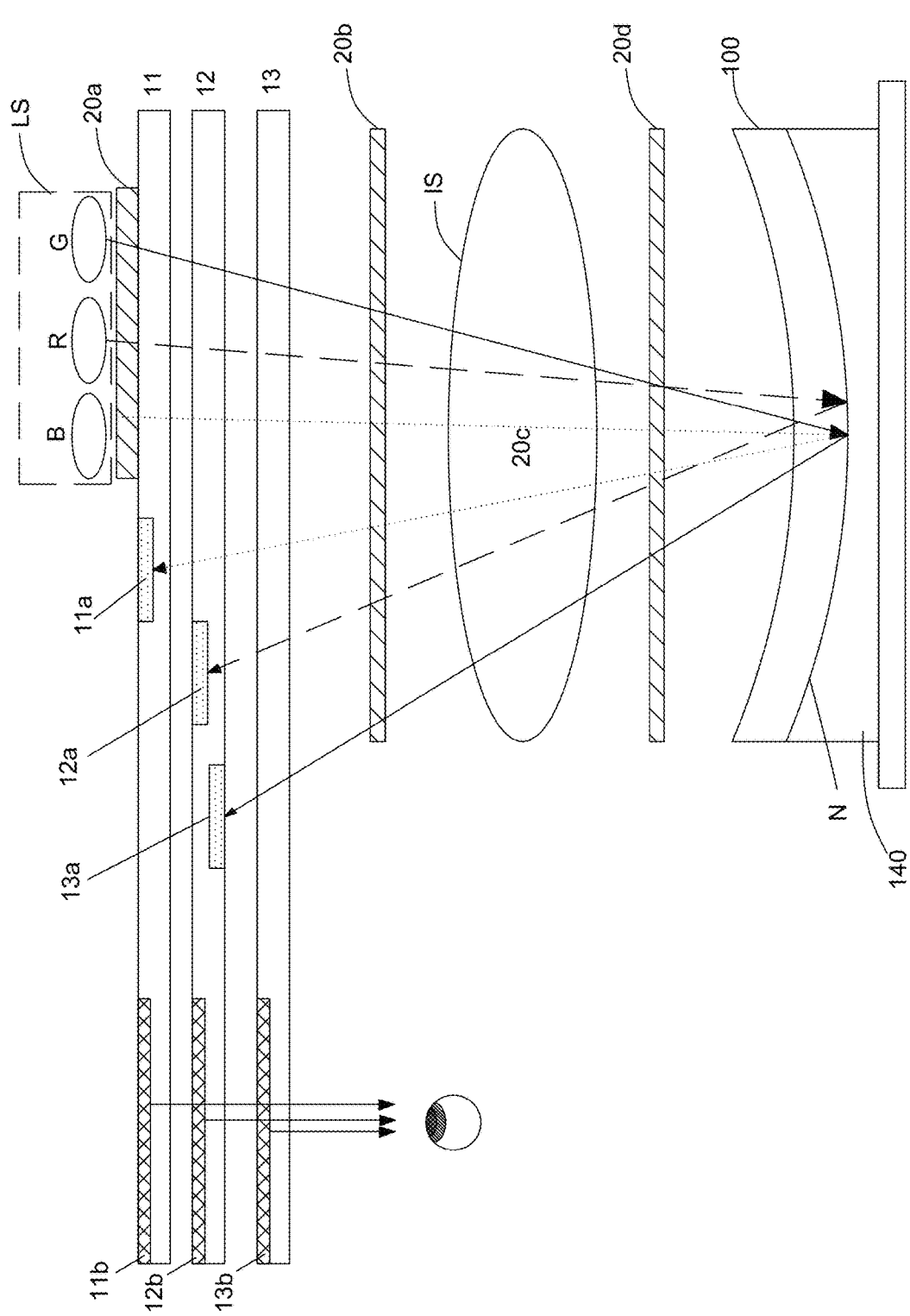
FIG. 8A is a schematic view showing the invention in one embodiment

Please refer to FIG. 8A and FIG. 1, FIG. 8A is a schematic view showing the invention in one embodiment, FIG. 1 is also a partial enlargement of the LCoS substrate 140 and SLM 100. The optical device 714A or optical device 714B, comprising: light source LS, an optical element 20, LCoS substrate 140 and SLM 100. In one embodiment, the LCoS substrate 140 and SLM 100 also have a shape of which exhibits a notch in at least one dimension.

Wherein, in one embodiment, the light source LS is intrinsically generated from the field-sequential color generating method, the light source LS utilizes three primary colors (R, G, B) are switched in sequence.

The optical element 20 are disposed on the light incident side of the light source LS, the optical element 20 are utilized to adjust the light path of the light source LS. The LCoS substrate 140 has a shape exhibits a notch N in at least one dimension, a light from the light source LS projected onto the LCoS substrate 140, so that the LCoS substrate 140 reflects the light entering the notch N.

After the light source LS reflected by the LCoS substrate 140, the outgoing light enter the SLM 100; the SLM 100 adjusts an azimuth angle of a liquid crystal (LC) to eliminate noise of the outgoing light. The outgoing light adjusted by the SLM 100 is projected onto the eyepieces to display images without the fringe field effects.

Furthermore, during operation of wearable device 700, the optical device 714a or optical device 714b may project a virtual image light (i.e., light associated with virtual content) onto the eyepieces 702A and the eyepieces 702B which may be observed by the user along with world light.

Continuing to FIG. 8A, the light source LS adjusting optical element 20 of the embodiment may further include a reflective polarizer 20a, a circular polarizer 20b, a lens array 20c and a double circular polarizer 20d. The optical element 20 is disposed on the transmission path of the light source LS and the lens array 20c located between the circular polarizer 20b and the double circular polarizer 20d. The optical element 20 functions for both advancing the light uniformity of the light source LS passing through the optical element 20 and adjusting the light radiation pattern of the light source LS passing through the optical element 20. In this embodiment is for flat wavefront.

Figure 8B:
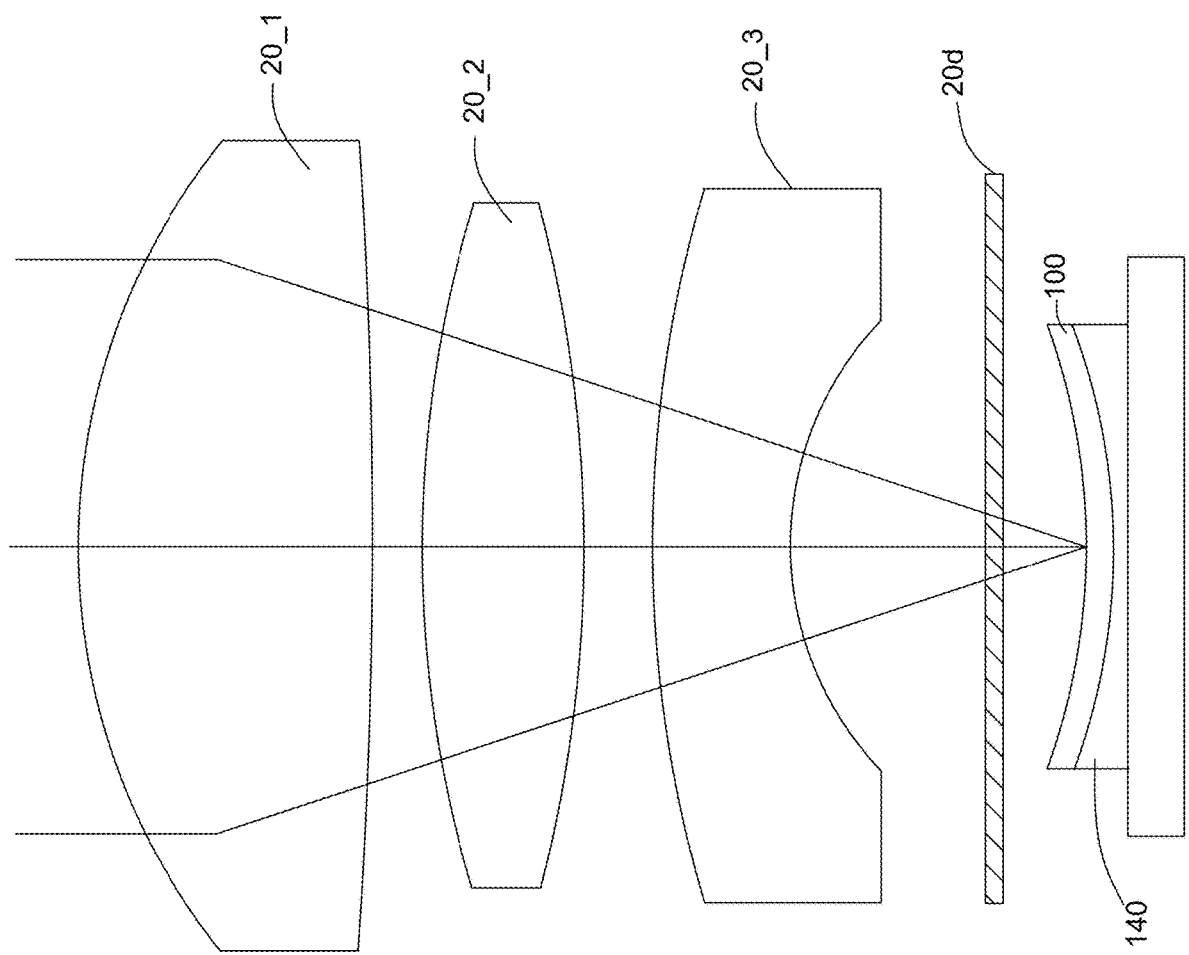
FIG. 8B is a schematic view showing an embodiment of lens array 20c.
Figure 8C:
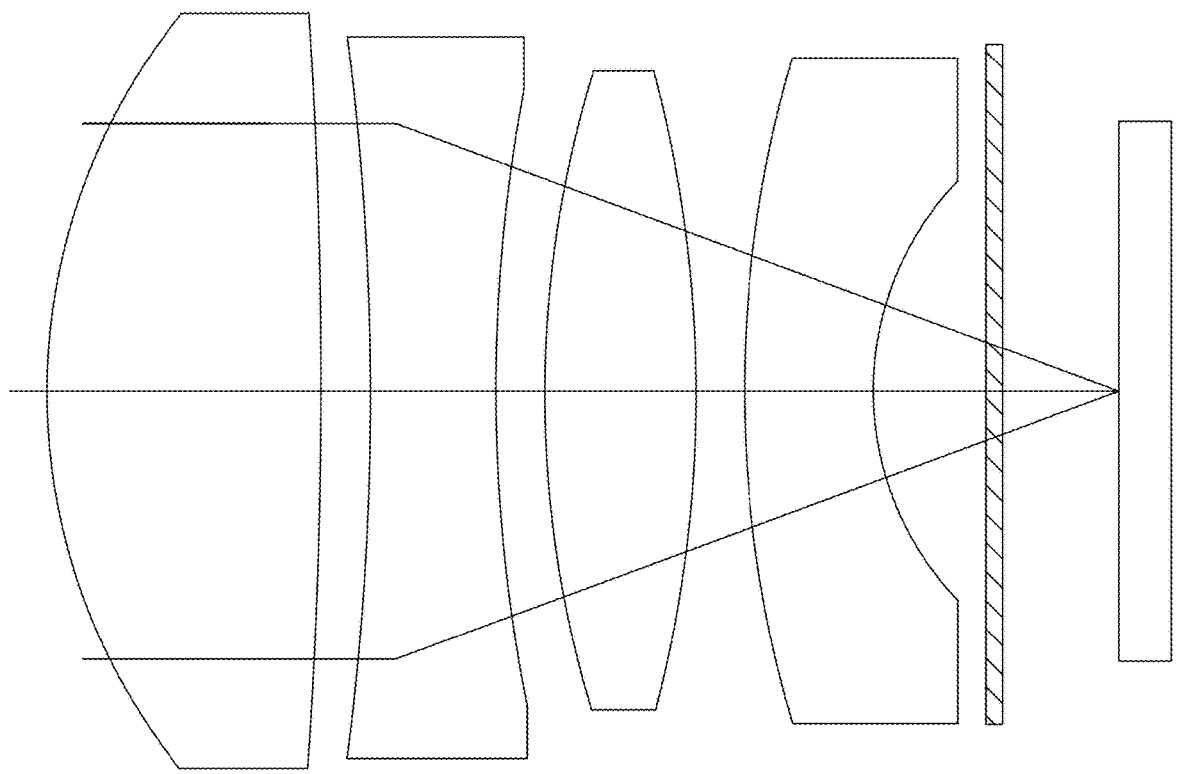
FIG. 8C is a schematic view showing a prior art of lens array.

As shown in FIG. 8B, in the embodiment, the lens array 20c includes a first lens 20_1, a second lens 20_2 and a third lens 20_3 sequentially arranged from the light incident side IS to the SLM 100. In the embodiment, the first lens 20_1 is, for example, an aspheric lens, the second lens 20_2 is, for example, a biconvex lens, the third lens 20_3 is, for example, a convexo-concave lens and has a convex surface facing the light incident side IS. As shown in FIG. 8C, the lens array of prior art requires more than three lens to adjust the transmission path of the light source due to the lack of curved LCoS. Therefore, this application makes the four lenses can be decrease to three lenses with better image quality, and 25% volume small than current AR optical engine at last.

Moreover, the light source LS utilizes RGB emits incident light, which is incident on a reflective polarizer 20a, a circular polarizer 20b and a double circular polarizer 20d. The circular polarizer 20b then converts a light from the light source LS to a polarized light. The incident light enters the LC cell and is reflected off of the pixel surface or back plane of the bottom LCoS substrate 140 of LC cell. Thereafter, the outgoing light is entered the SLM 100 to eliminate noise and passed through the double circular polarizer 20d. The outgoing light is guided by a waveguide WG in the eyepieces and reflected into a user's eyes by incoupling gratings (ICGs) 11b, 12b and 13b. The edge of the LCoS substrate 140 is curved toward the center of the LCoS substrate 140, and the optical path of the incident light is perpendicular to the curved surface of the LCoS substrate 140. The light entering the SLM 100 can be phase adjusted (Holography) light or light intensity adjusted light. In one embodiment, the waveguide WG is a liquid crystal polarization grating (LCPG) waveguide, the incident light does not need to be a flat wavefront.

It should be noted that, due to the above reasons, the shape of the wavefront of the incident light does not need to be flat, and the wavefront of the incident light can be a spherical wave or a plane wave.

The eyepiece 702A or eyepiece 702B includes three waveguides 11, 12, and 13. Each of the three waveguides 11, 12, and 13 may, for example, correspond to a different color of light and/or depth of virtual content. The eyepiece 702A or eyepiece 702B further includes incoupling optical elements, e.g., ICGs 11a, 12a, and 13a disposed upon waveguides 11, 12, and 13, respectively. ICGs 11a, 12a, and 13a are configured to couple light into waveguides 11, 12, and 13, respectively, for propagation via total internal reflection (TIR). In addition, the eyepiece 702A or eyepiece 702B also includes outcoupling diffractive optical elements 11b, 12b, and 13b disposed upon waveguides 11, 12, and 13, respectively. The outcoupling diffractive optical elements 11b, 12b, and 13b may be configured to couple light out of waveguides 11, 12, and 13, respectively, toward one or both observer's eyes. In one embodiment, reflected or diffraction light ray is the outgoing light from SLM 100.

In one embodiment as shown in FIG. 8B, because the LCoS substrate 140 exhibits curvature in at least one dimension, so that the lens array 20c adjusts the optical path of the incident light, and the optical path of the incident light is perpendicular to the LCoS substrate 140. The optical path of the incident light is perpendicular to the curved surface of the LCoS substrate 140. In other words, the optical path of the incident light is perpendicular to the notch N of the LCoS substrate 140. Wherein, incident light will also be perpendicular to the center and edge of the LCoS substrate 140 without field curvature.

Figure 9A:
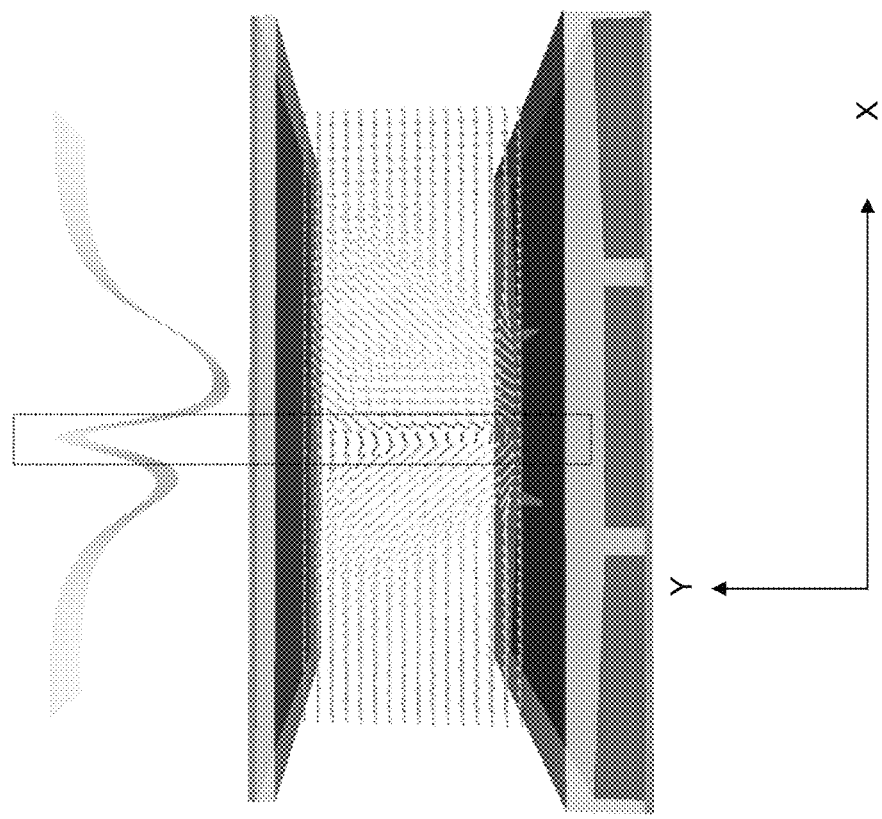
FIG. 9A is a schematic stereogram showing the FFE before the azimuth angle correction.
Figure 9A:
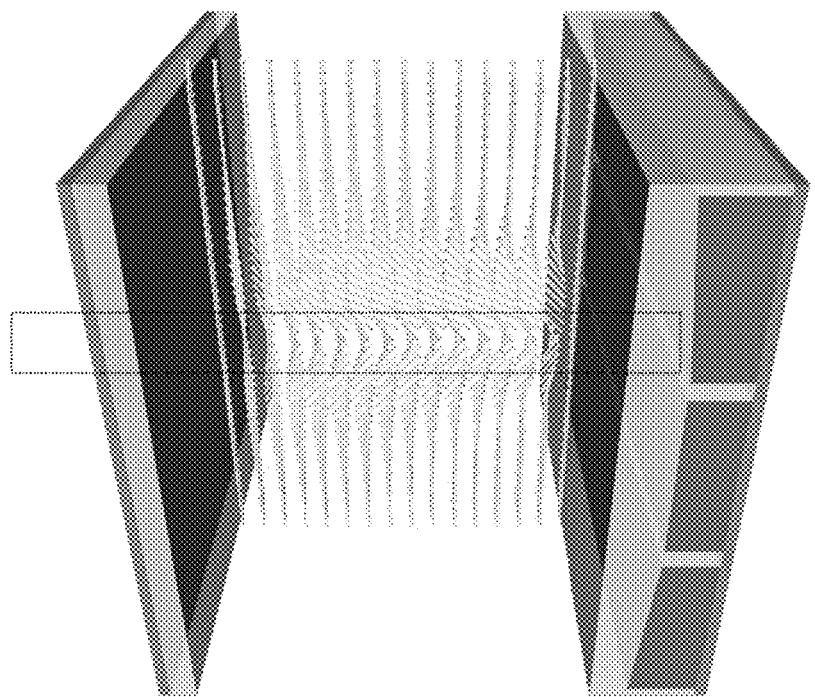
Figure 9B:
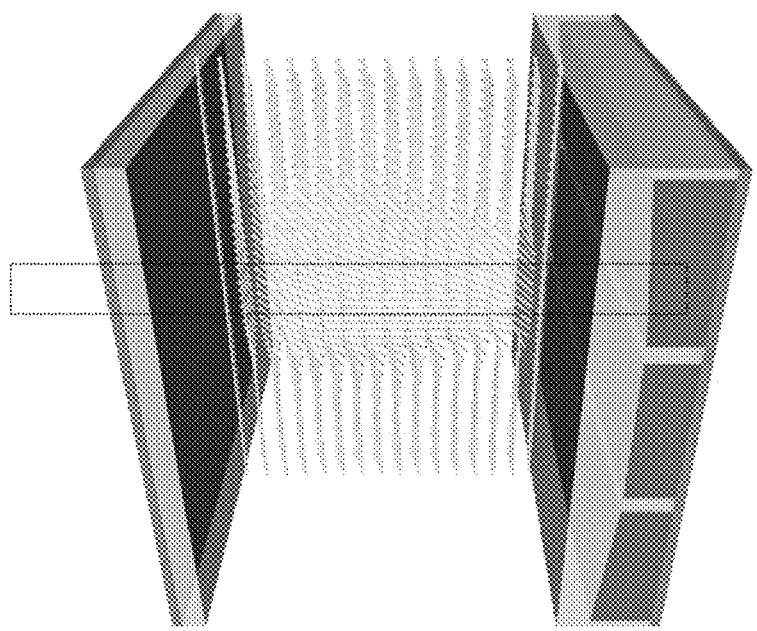
FIG. 9B is a schematic stereogram showing the FFE after the azimuth angle correction.
Figure 9B:
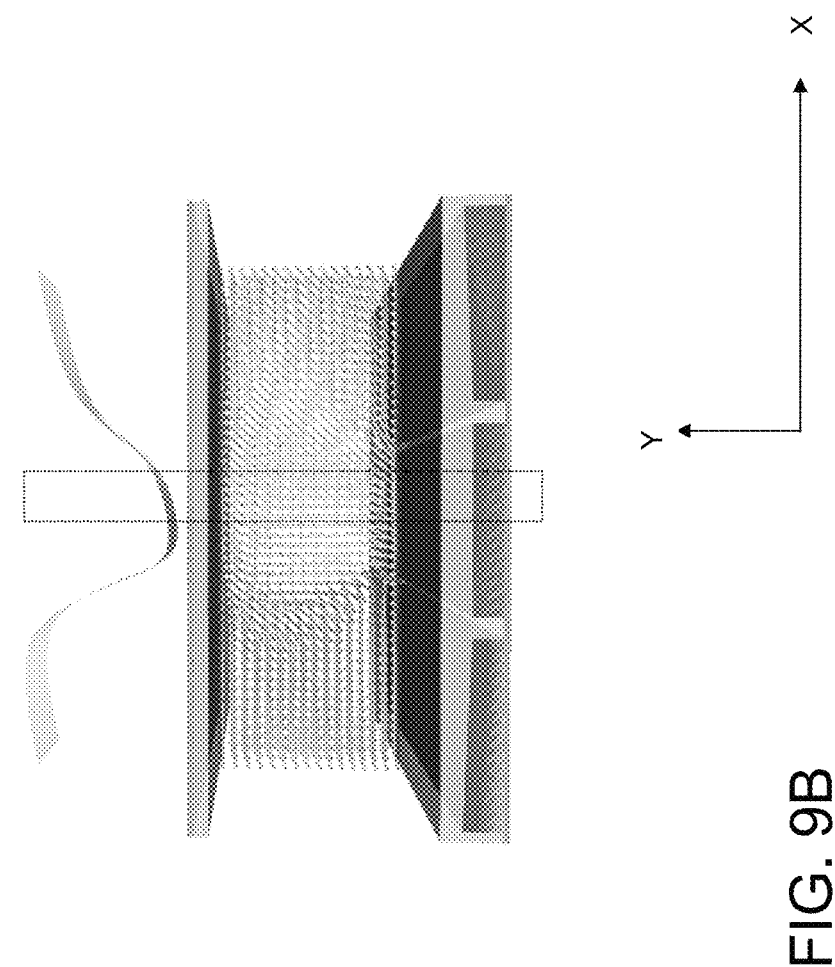

Please also refer to the FIG. 9A and FIG. 9B, FIG. 9A is a schematic stereogram showing the FFE before the azimuth angle correction, FIG. 9B is a schematic stereogram showing the FFE after the azimuth angle correction. In this embodiment, the surface of the LCoS substrate presents a ladder shape. That means the notch shape of the LCoS substrate can be the ladder shape. In other words, The LCoS substrate corresponding to adjacent pixels have a height difference. The liquid crystal layers in the first area 15a and the second area 15b are both adjusted on the X-Y plane, that is, the liquid crystal layers in the first area 15a and the second area 15b have a first azimuth angle α and a second azimuth angle respectively. After photo-alignment of the liquid crystal layer, the azimuth angle in the X-Y plane has changed. The present invention is to adjust the liquid crystal layers of the first area 15a and the second area 15b on the X-Y plane, so that the azimuth angle is changed to offset the FFE. Therefore, the liquid crystal in the dashed line becomes uniform after FFE is eliminated by changing the azimuth angle.

Figure 10A:
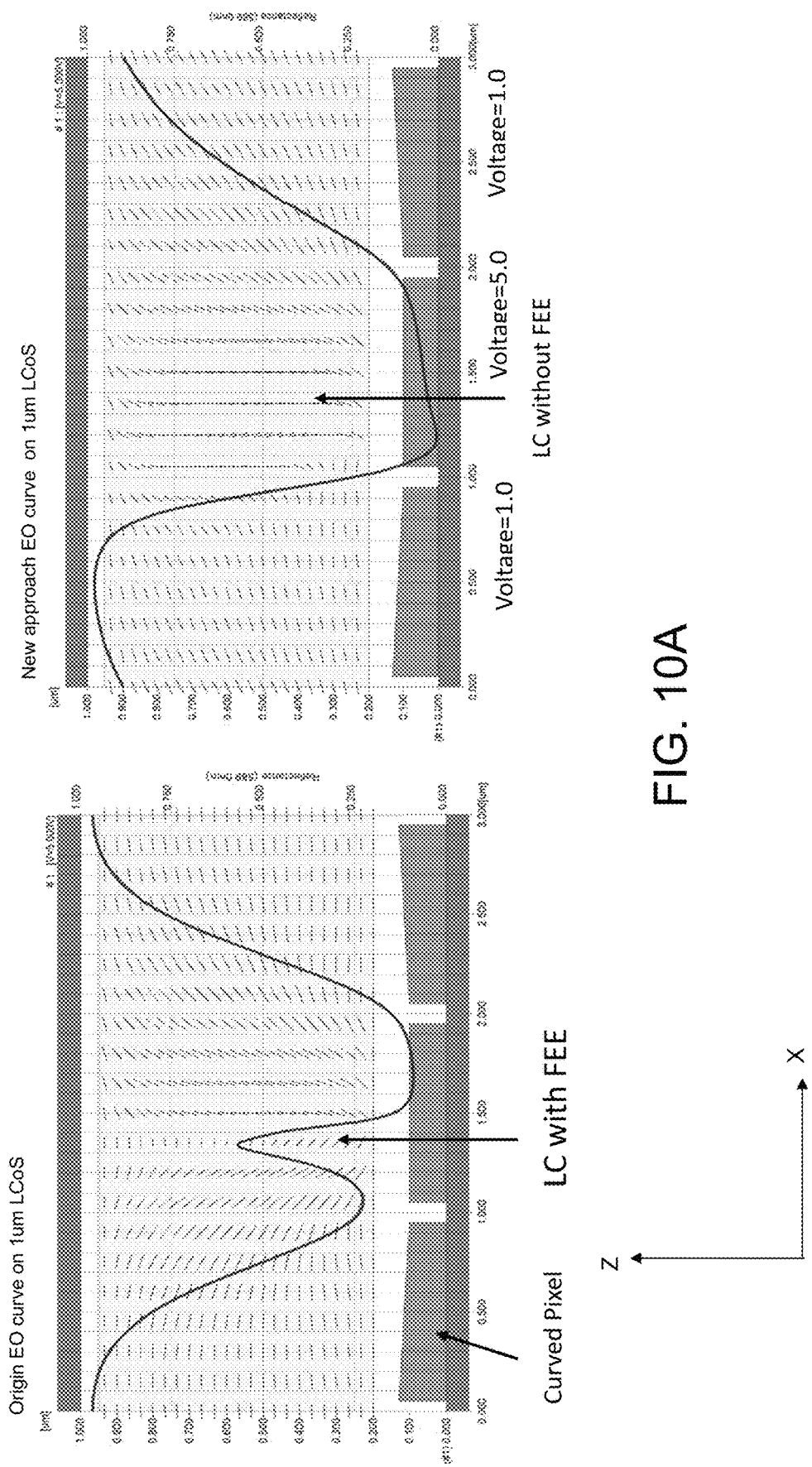
FIG. 10A depicts that original EO curve on 1 um LCoS and new approach EO curve on 1 um LCoS.

Please refer to FIG. 10A, FIG. 10A depicts that original EO curve on 1 um LCoS and new approach EO curve on 1 um LCoS. Wherein, the plane where the liquid crystal is located is the XZ plane, the segmented LCoS substrates 140 is as shown with curved pixels. Utilizing the present invention to eliminate FFE, the FFE at the arrow place is obviously eliminated and the new approach EO curve has been smoothed. In other words, the curved LCoS and SLM can effectively eliminate FFE of LC.

Figure 10B:
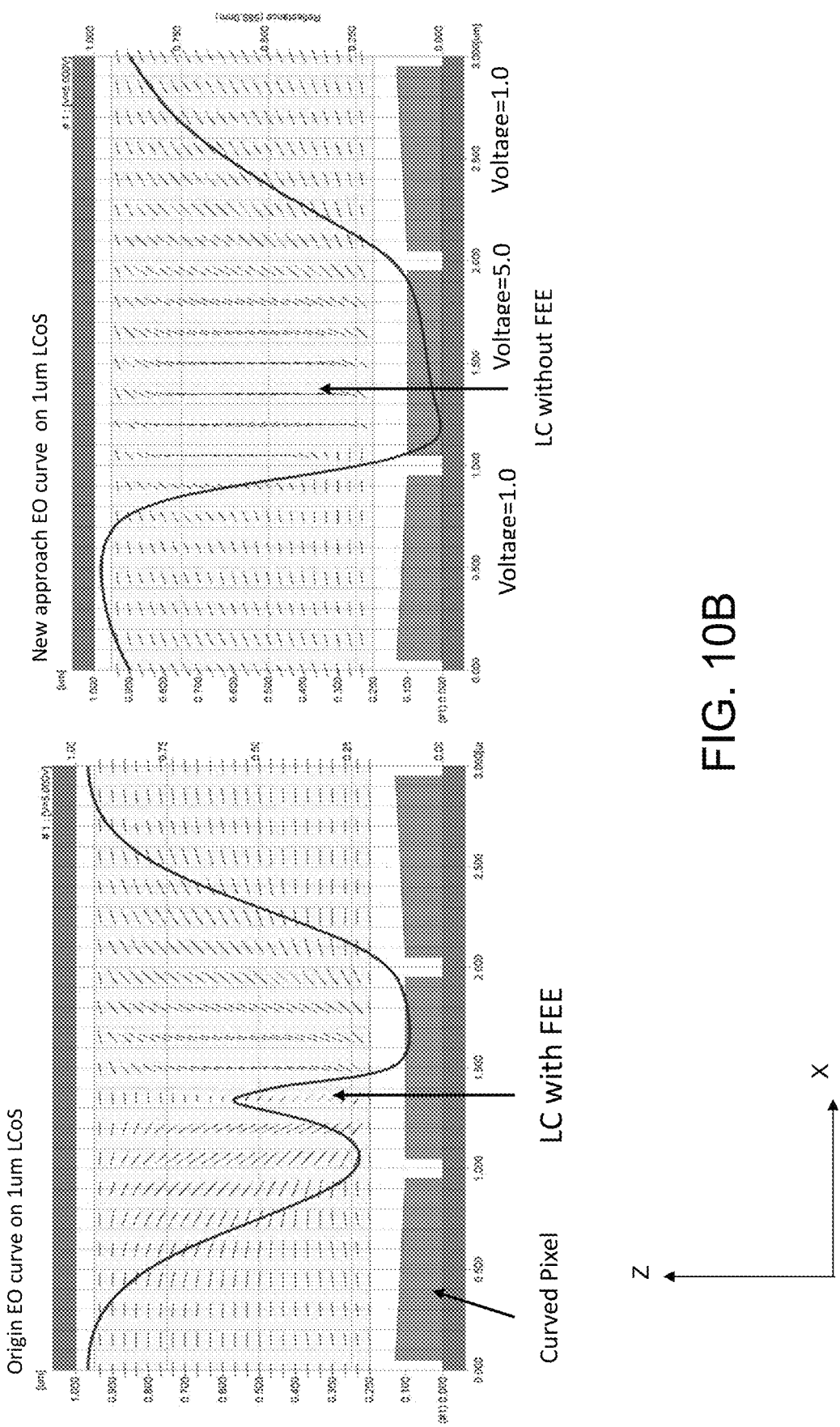
FIG. 10B depicts that original EO curve on 1 um LCoS and new approach EO curve on 1 um LCoS in another embodiment.

Please also refer to FIG. 10B, FIG. 10B depicts that original EO curve on 1 um LCoS and new approach EO curve on 1 um LCoS in another embodiment. In this embodiment, the segmented LCoS substrates 140 are provided with different voltages. the voltages of segmented LCoS substrates 140 from left to right are 1V, 5V and 1V. Therefore, the liquid crystal in the dashed line becomes uniform after FFE is eliminated by changing the azimuth angle.

Figure 11:
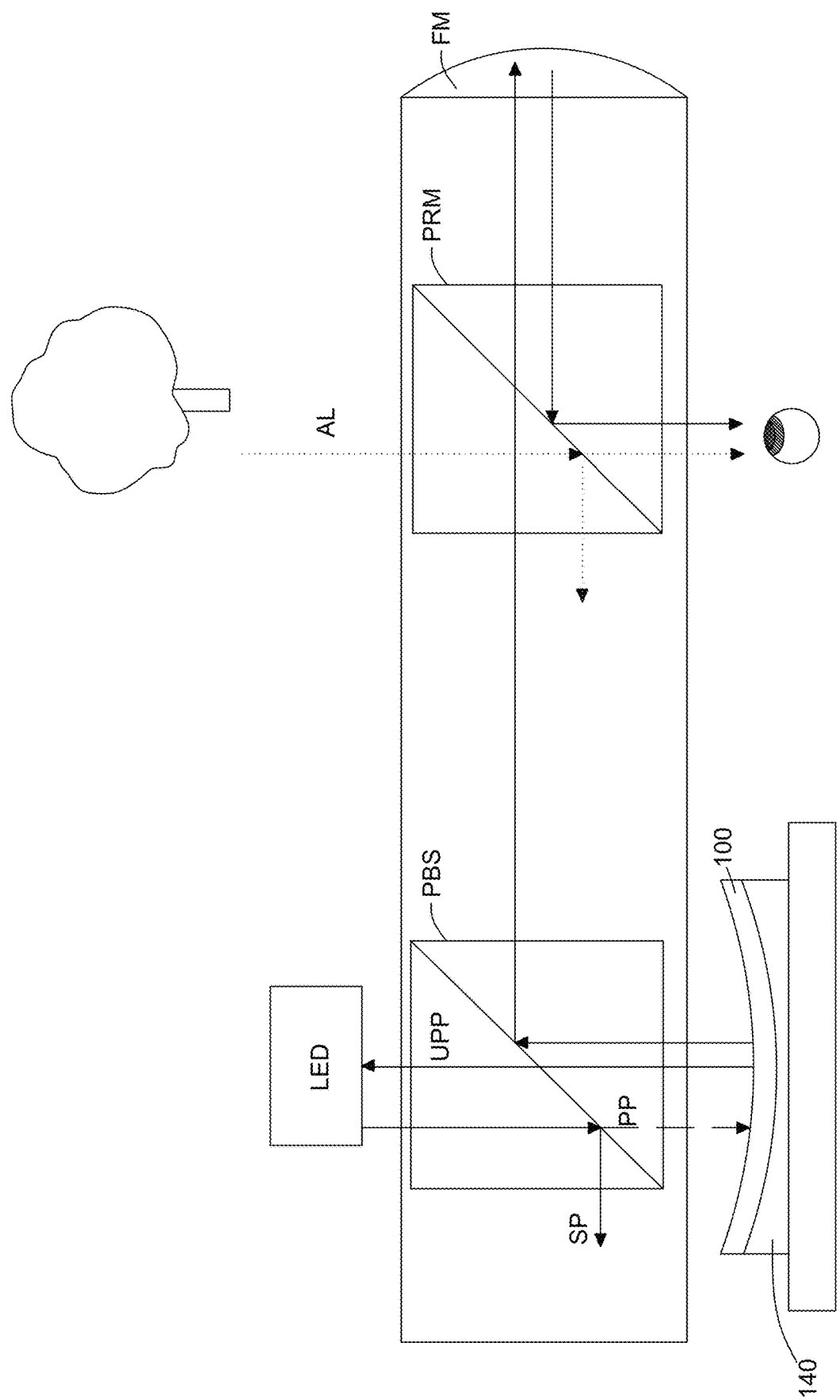
FIG. 11 is a schematic view showing the optical element comprising polarizing beam splitter (PBS).

In some embodiments, the optical element can be shown in FIG. 11, the optical element comprising polarizing beam splitter (PBS). The PBS dividing the light source LS into two mutually orthogonal polarized lights. In other words, the PBS is engaged as crossed polarizers for the reflective display system. When the light emitted from an LED source enters the PBS, the s-polarized light SP is reflected away so that only the p-polarized light PP can reach the LCoS substrate 140, indicating that only half of the incident light could be modulated.

Passing through the LCoS substrate 140, the polarized light parallel to the light source enters the LCoS substrate 140, the LCoS substrate 140 reflects the polarized light so that an outgoing light enters the SLM 100 to eliminate noise, the outgoing light is reflected by the PBS to a partially-reflective and focusing mirror (FM), and an ambient light is also transmitted to the partially-reflective mirror (PRM), the outgoing light and the ambient light are transmitted to observer's eyes. Further explanation, passing through the LCoS substrate 140, the unmodulated p-polarized light UPP transmits back to the LED source, while the π-phase retarded s-polarized light gets reflected by the PBS and directed to observer's eyes by a PRM and a FM. As the ambient light AL transmits to PRM as well, an AR experience with an LCoS-generated display and real world can be achieved.

Figure 12:
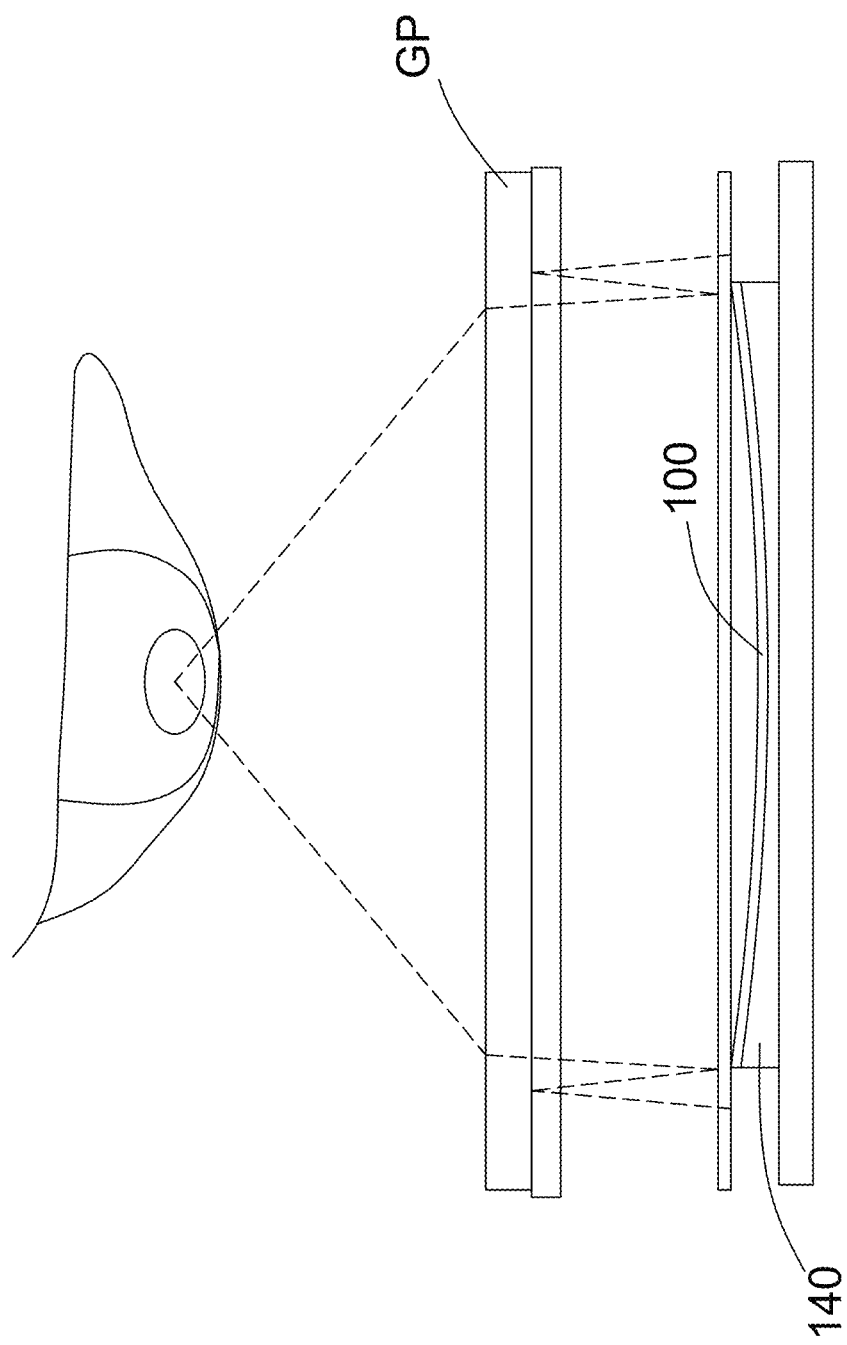
FIG. 12 is a schematic view showing the optical device of VR utilizing the microdisplay has a shape of which exhibits a notch in at least one dimension.

In some embodiments, the optical device of VR can be shown in FIG. 12, the optical device of VR utilizing the microdisplay has a shape of which exhibits a notch in at least one dimension. Wherein, the optical device is a reflective VR utilizing a geometric phase (GP) lens GP, and the GP lens GP is disposed in front of the observer's eyeball. In other words, FIG. 11 provides a curved microdisplay, its surface curvature is like an observer's eyeball.

Figure 13:
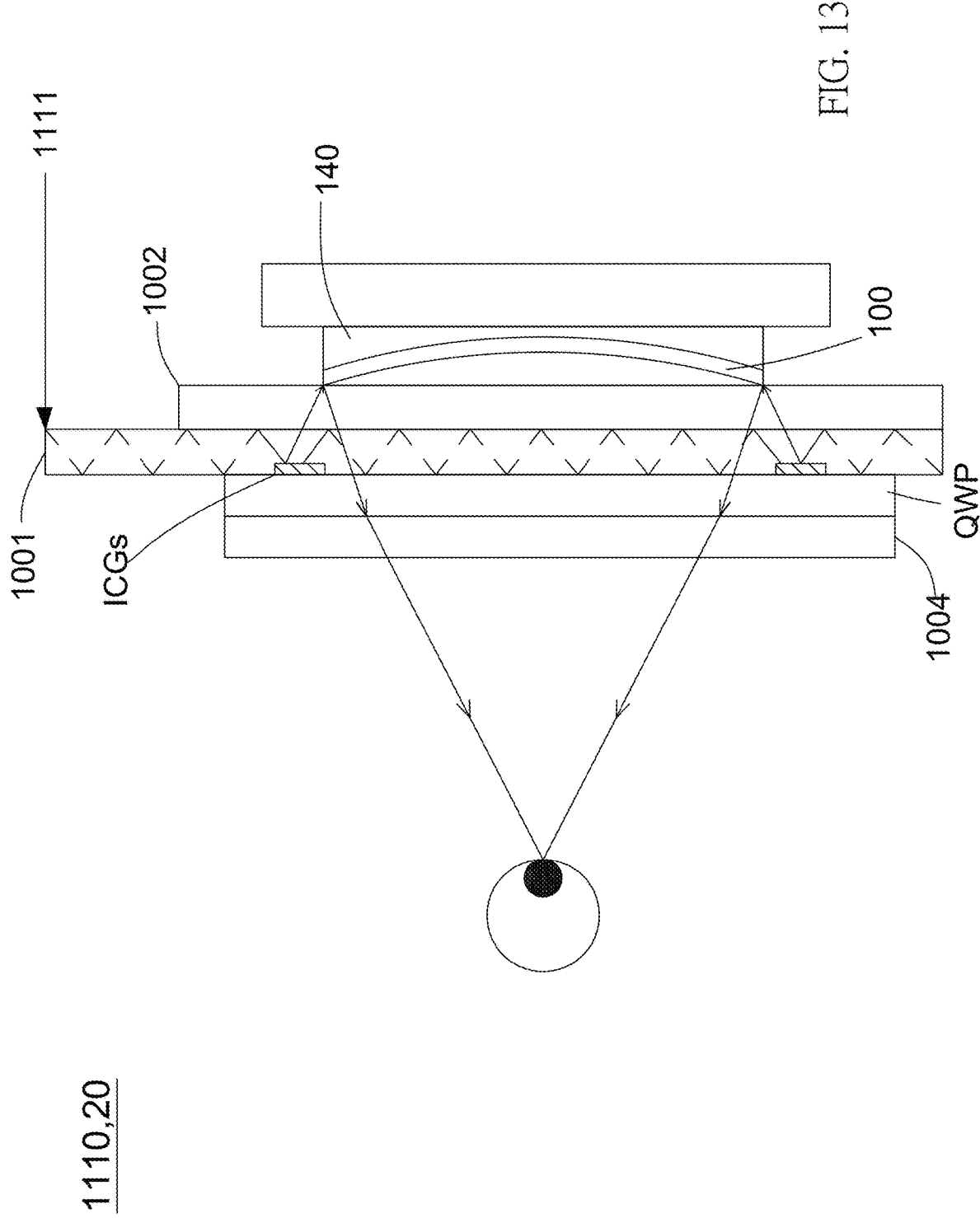
FIG. 13 is a schematic view showing the invention in one embodiment.

Please refer to the FIG. 13, in another embodiment of optical device 1110, this optical device 1110 can be satisfied by VR, the optical element 20 comprises a waveguide 1001, polarizer 1002 and quarter-wave plate (QWP). The light 1111 form the light source enters the waveguide 1001, the waveguide 1001 guides the light 1111 into the LCoS substrate 140. The polarizer 1002 converts the light to a polarized light according to the incident light. The quarter-wave plate (QWP) converts a right circularly polarized (RCP) light or a left circularly polarized (LCP) according the outgoing light. a lens array 1004 disposes on the QWP, the RCP light or LCP light is projected on the lens array 1004. Wherein, the lens array 1004 is a GP lens or a Pancharatnam-Berry Phase (PB) lens of eyepiece; and the light 1111 is guided by the waveguide 1001 and reflected into the LCoS substrate 140 and SLM 100 by incoupling gratings ICGs. The principle of SLM 100 is similar to that described above, and it is not described here redundantly.

Figure 14:
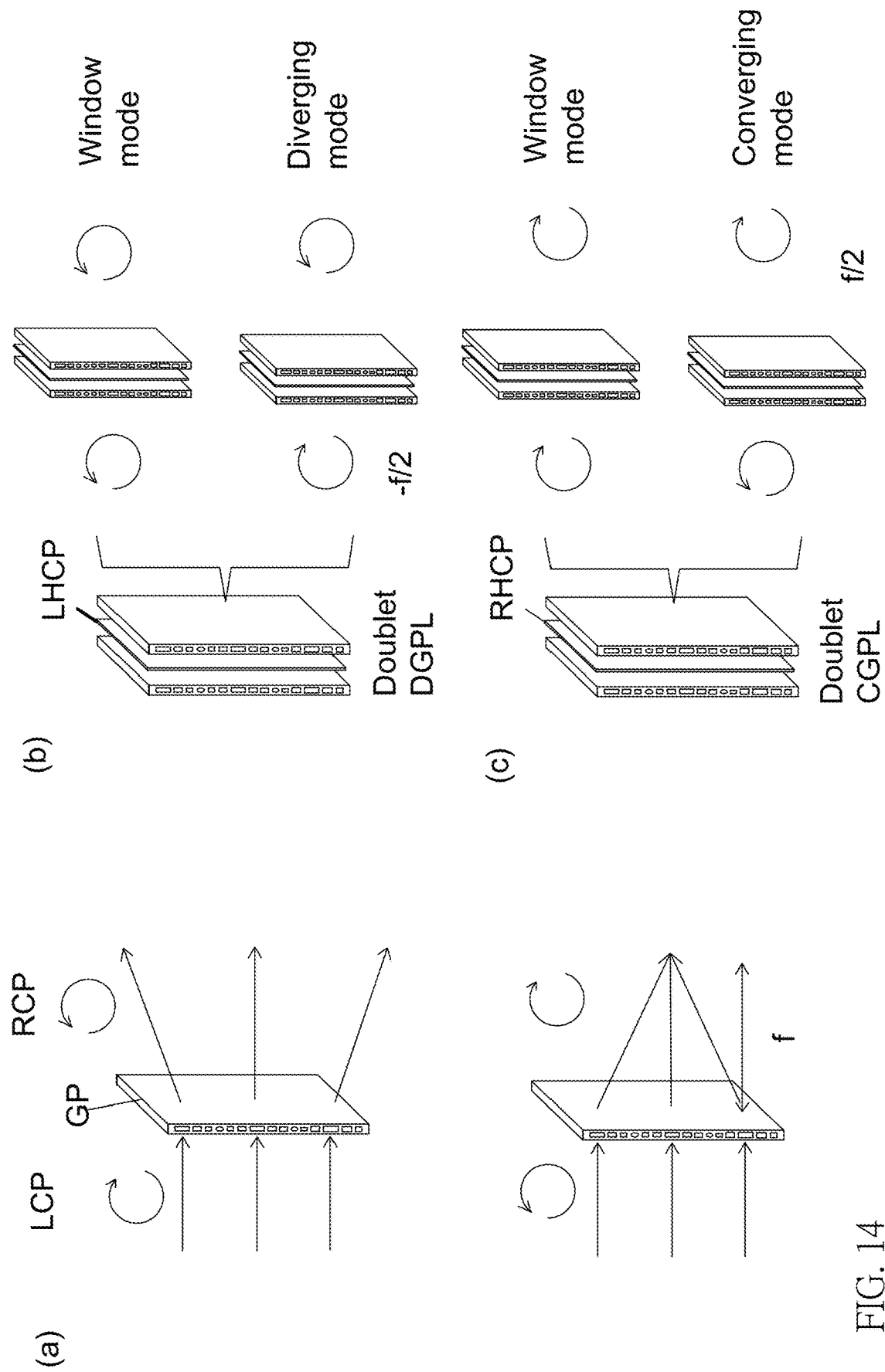
FIG. 14 is an illustration of the GP lens operation depending on the polarization state of the input beam.

Please refer to FIG. 14, FIG. 14 is an illustration of the GP lens operation depending on the polarization state of the input beam. It should be noted that, the optical device 1110 using a GP lens. Operating mode of (a) the single GP lens, and the doublet GP lens for (b) a diverging mode and (c) a converging mode. This device has a doublet structure in which two GP lenses are sandwiched with the circular polarizer in the middle. The doublet GP lens can act as an optically transparent window or lens mode depending on the polarization state of the input beam and the type of circular polarizer plate. If the polarizer plate inserted between the two GP lenses is left-handed circular polarizer, the doublet GP lens operates as a window mode for the RCP state, and while as a diverging lens mode for the LCP state. In contrast, if a right-handed circular polarizer is used, the doublet GP lens operates as a window mode for the LCP, while as a converging lens for the RCP. This optical device can perform the multiple optical functions with a thin thickness (~2 mm). Wherein, DGPL means Diverging GP lens, CGPL means Converging GP lens, LHCP means left-handed circular polarizer, and RHCP means right-handed circular polarizer.

Figure 15:
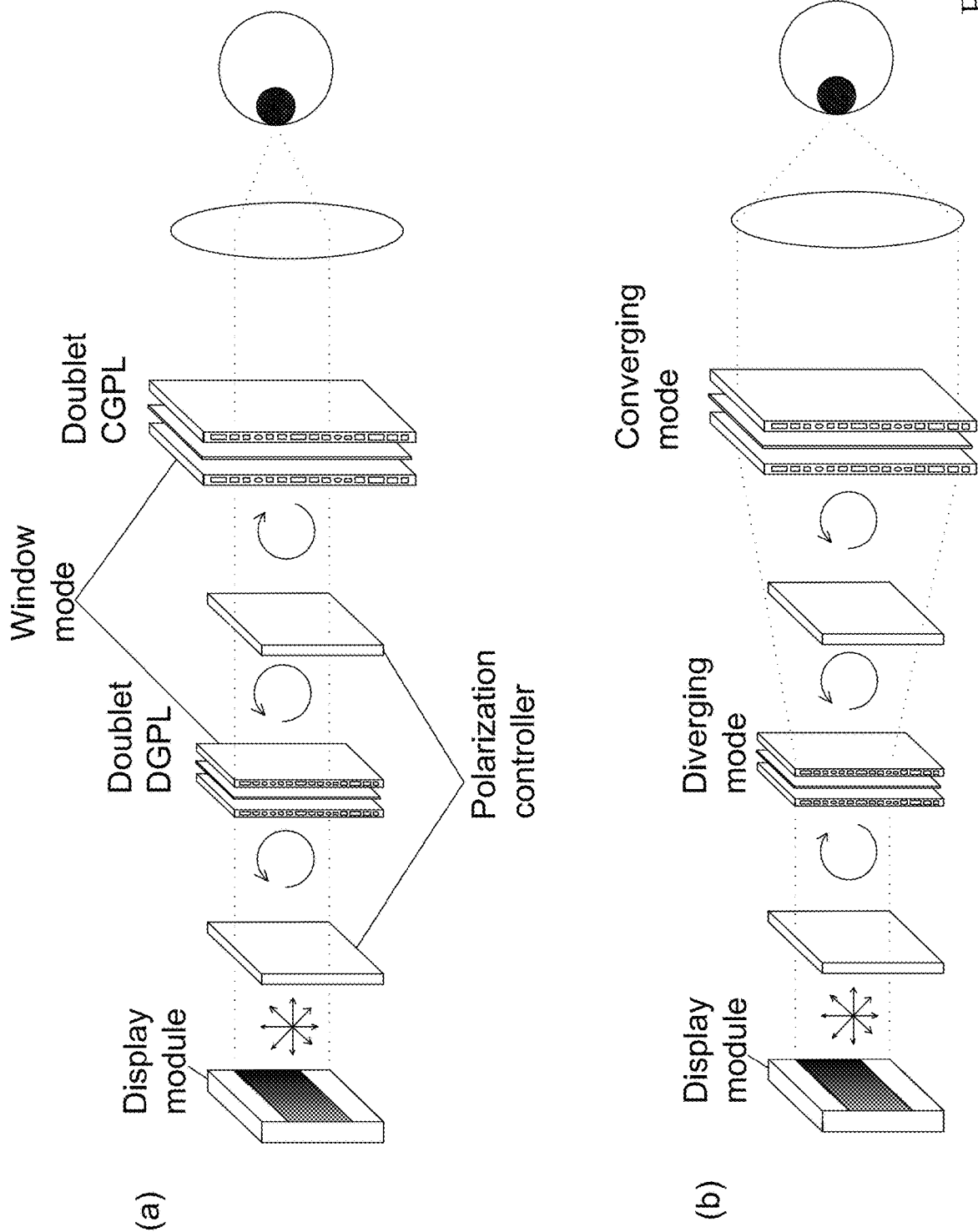
FIG. 15 depicts the optical configuration of the proposed foveated display for VR.

Moreover, FIG. 15 depicts the optical configuration of the proposed foveated display for VR. The proposed system consists of a single display module, two polarization controllers, diverging and converging doublet GP lenses, and eyepiece lens. The display module for retinal-projection displays is based on the parallel-beam projection with a narrow beam width. The first polarization controller converts an input beam with random or a specific polarization state into LCP or RCP state. The second polarization controller transmits the input beam without the polarization change or changes it to the RCP state. These controllers can be implemented with a switchable active-type half-wave plate. Two polarization controllers are synchronized to combine two images in dual operating modes in real-time. And finally, the eyepiece lens focuses a collimated beam, which provides a retinal-projection image by placing the pupil of the observer's eye at the focal point. Wherein, FIG. 15 (a) fovea mode and FIG. 15 (b) peripheral mode. The polarization state is adjusted by the polarization controller for each mode. dashed lines indicate the beam path. The input beam can be perpendicular to the LCoS substrate, and input beam can be perpendicular to the edge of the LCoS substrate without field curvature.

It should be noted that, when the SLM size gets bigger, and the eye box will get larger when the SLM pixel pitch gets smaller. Therefore, both the FOV and the eye box are limited by the characteristics of the SLM. Wherein, the eye box refers to an area between the near-eye display optical module and the eyeball, the eye box is also the area with the clearest display content. But smaller pixel size has to implement by this invention to suppress the FFE, which can be achieved 1 um pixel with curved LCoS substrate and curved SLMs. Wherein, the ambient light enters LCoS substrate from where the human eyeball is located.

In summary, the alignment film of this disclosure has different areas corresponding to different patterns, the liquid crystals in the area where the FFE is located have a specific azimuth angle to achieve the objective of suppressing the FFE. Moreover, AR needs smaller pixels to maintain high pixels, so the pixels must be smaller and smaller, but the present invention can eliminate the FFE and provide smaller pixels

What is claimed is:

1. An optical device, comprising:
   a microdisplay, is utilized for Augmented Reality (AR) or Virtual Reality (VR), the microdisplay has a shape of which exhibits a notch in at least one dimension, wherein the microdisplay comprising:
   a light source;
   an optical element, adjusted the light path of the light source;
   an LCoS substrate, the shape of which exhibits the notch in at least one dimension, a light from the light source projected onto the LCoS substrate, the LCoS substrate reflects the light entering the notch; and
   a spatial light modulator (SLM), after an outgoing light reflected by the LCoS substrate, the outgoing light enters the spatial light modulator; the spatial light modulator adjusts an azimuth angle of a liquid crystal layer to eliminate noise of the outgoing light, wherein the optical element comprising:
   a polarizer, converting a polarized light according to an incident light from the light source; and
   a lens array, after the incident light passes through the lens array, the incident light is made uniform, and the lens array adjusts the light path of the incident light entering the LCoS substrate;
   wherein, the LCoS substrate reflects the incident light, so that the outgoing light enters the SLM to eliminate noise; the outgoing light is guided by a waveguide in the eyepieces and reflected into an observer's eye by a grating; the spatial modulator eliminates the fringe field effect of the incident light and the outgoing light adjusted by the SLM is projected onto an eyepiece to display images without the fringe field effects.

2. The optical device according to claim 1, wherein the LCoS substrate exhibits curvature in at least one dimension, so that the lens array adjusts the optical path of the incident light, and the optical path of the incident light is perpendicular to the LCoS substrate.

3. The optical device according to claim 2, wherein a pixel on the edge of the LCoS substrate is curved toward the center of the LCoS substrate, and the optical path of the incident light is perpendicular to the curved surface of the LCoS substrate.

4. The optical device according to claim 2, wherein the LCoS substrate exhibits curvature in at least one dimension, so that the lens array adjusts the optical path of the incident light, and the optical path of the incident light is perpendicular to the notch of the LCoS substrate.

5. The optical device according to claim 2, wherein the SLM comprising:
   a transparent electrode layer;
   a reflective electrode layer including a pixel electrode, in which a pixel area is surrounded by a boundary of the pixel electrode;
   a liquid crystal layer located between the transparent electrode layer and the reflective electrode layer to establish the pixel formed by the liquid crystal layer covering the pixel area in the pixel electrode; and
   an alignment film having a first pattern and a second pattern and covering the pixel area, wherein the first pattern and the second pattern in the pixel area make liquid crystals in the liquid crystal layer of the pixel generate arrangements of a first azimuth angle and a second azimuth angle, respectively, and the first azimuth angle is different from the second azimuth angle;
   wherein, if the liquid crystal layer is regarded as being parallel to an X-Y plane, then the first azimuth angle and the second azimuth angle are both an included angle between an X-axis and each of the liquid crystals in the liquid crystal layer on the X-Y plane.

6. An optical device, comprising:
a microdisplay, is utilized for Augmented Reality (AR) or Virtual Reality (VR), the microdisplay has a shape of which exhibits a notch in at least one dimension, wherein the microdisplay comprising:
a light source;
an optical element, adjusted the light path of the light source;
an LCoS substrate, the shape of which exhibits the notch in at least one dimension, a light from the light source projected onto the LCoS substrate, the LCoS substrate reflects the light entering the notch; and
a spatial light modulator (SLM), after an outgoing light reflected by the LCoS substrate, the outgoing light enters the spatial light modulator; the spatial light modulator adjusts an azimuth angle of a liquid crystal layer to eliminate noise of the outgoing light, wherein the optical element comprising:
a polarizing beam splitter (PBS), dividing the light from the light source into two mutually orthogonal polarized lights;
wherein, the polarized light parallel to the light enters the LCoS substrate, the LCoS substrate reflects the polarized light so that an outgoing light enters the SLM to eliminate noise, the outgoing light is reflected by the PBS to a partially-reflective and focusing mirror (FM), and an ambient light is also transmitted to the PRM, the outgoing light and the ambient light are transmitted to the observer's eyes.

7. The optical device according to claim 6, wherein the LCoS substrate exhibits curvature in at least one dimension, so that the lens array adjusts the optical path of the polarized light, and the optical path of the polarized light is perpendicular to the LCoS substrate.

8. The optical device according to claim 7, wherein a pixel on the edge of the LCoS substrate is curved toward the center of the LCoS substrate, and the optical path of the polarized light is perpendicular to the curved surface of the LCoS substrate.

9. The optical device according to claim 7, wherein the LCoS substrate exhibits curvature in at least one dimension, so that the PBS adjusts the optical path of the polarized light, and the optical path of the polarized light is perpendicular to the notch of the LCoS substrate.

10. The optical device according to claim 7, wherein the SLM comprising:
a transparent electrode layer;
a reflective electrode layer including a pixel electrode, in which a pixel area is surrounded by a boundary of the pixel electrode;
a liquid crystal layer located between the transparent electrode layer and the reflective electrode layer to establish the pixel formed by the liquid crystal layer covering the pixel area in the pixel electrode; and
an alignment film having a first pattern and a second pattern and covering the pixel area, wherein the first pattern and the second pattern in the pixel area make liquid crystals in the liquid crystal layer of the pixel generate arrangements of a first azimuth angle and a second azimuth angle, respectively, and the first azimuth angle is different from the second azimuth angle;
wherein, if the liquid crystal layer is regarded as being parallel to an X-Y plane, then the first azimuth angle and the second azimuth angle are both an included angle between an X-axis and each of the liquid crystals in the liquid crystal layer on the X-Y plane.

11. The optical device according to claim 2, wherein the surface of the LCoS substrate presents a ladder shape.

12. An optical device, comprising:
a microdisplay, is utilized for Augmented Reality (AR) or Virtual Reality (VR), the microdisplay has a shape of which exhibits a notch in at least one dimension, wherein the microdisplay comprising:
a light source;
an optical element, adjusted the light path of the light source;
an LCoS substrate, the shape of which exhibits the notch in at least one dimension, a light from the light source projected onto the LCoS substrate, the LCoS substrate reflects the light entering the notch; and
a spatial light modulator (SLM), after an outgoing light reflected by the LCoS substrate, the outgoing light enters the spatial light modulator; the spatial light modulator adjusts an azimuth angle of a liquid crystal layer to eliminate noise of the outgoing light, wherein the optical element comprising:
a waveguide, the light enters the waveguide, the waveguide guides the light into the LCoS substrate;
a polarizer, converting a polarized light according to the light;
a quarter-wave plate (QWP), converting a right circularly polarized (RCP) light or a left circularly polarized (LCP) according the outgoing light; and
a lens array, disposing on the QWP, the RCP light or LCP light is projected on the lens array;
wherein, the LCoS substrate reflects an incident light, so that the outgoing light enters the SLM to eliminate noise; and the spatial modulator eliminates the fringe field effect of the incident light.

13. The optical device according to claim 12, wherein the LCoS substrate exhibits curvature in at least one dimension, so that the lens array adjusts the optical path of the incident light, and the optical path of the incident light is perpendicular to the LCoS substrate.

14. The optical device according to claim 13, wherein a pixel on the edge of the LCoS substrate is curved toward the center of the LCoS substrate, and the optical path of the incident light is perpendicular to the curved surface of the LCoS substrate.

15. The optical device according to claim 13, wherein the SLM comprising:
a transparent electrode layer;
a reflective electrode layer including a pixel electrode, in which a pixel area is surrounded by a boundary of the pixel electrode;
a liquid crystal layer located between the transparent electrode layer and the reflective electrode layer to establish the pixel formed by the liquid crystal layer covering the pixel area in the pixel electrode; and
an alignment film having a first pattern and a second pattern and covering the pixel area, wherein the first pattern and the second pattern in the pixel area make liquid crystals in the liquid crystal layer of the pixel generate arrangements of a first azimuth angle and a second azimuth angle, respectively, and the first azimuth angle is different from the second azimuth angle;
wherein, if the liquid crystal layer is regarded as being parallel to an X-Y plane, then the first azimuth angle and the second azimuth angle are both an included angle between an X-axis and each of the liquid crystals in the liquid crystal layer on the X-Y plane.

* * * * *